(12) United States Patent
Li et al.

(10) Patent No.: US 11,823,510 B2
(45) Date of Patent: Nov. 21, 2023

(54) DEVICES AND METHODS FOR CONTROLLING SMART LOCK

(71) Applicant: YUNDING NETWORK TECHNOLOGY (BEIJING) CO., LTD., Beijing (CN)

(72) Inventors: Tao Li, Beijing (CN); Binghui Peng, Beijing (CN); Qi Yi, Beijing (CN); Kai Zhang, Beijing (CN); Wenfeng Li, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/146,437

(22) Filed: Dec. 26, 2022

(65) Prior Publication Data

US 2023/0125619 A1    Apr. 27, 2023

Related U.S. Application Data

(63) Continuation of application No. 17/454,624, filed on Nov. 12, 2021, now Pat. No. 11,538,298, which is a (Continued)

(30) Foreign Application Priority Data

Aug. 6, 2019 (CN) .......................... 201910722281.4
Aug. 8, 2019 (CN) .......................... 201910730428.4

(Continued)

(51) Int. Cl.
*G07C 9/00* (2020.01)
*H04W 4/80* (2018.01)
(Continued)

(52) U.S. Cl.
CPC ...... *G07C 9/00309* (2013.01); *E05B 47/0012* (2013.01); *G08B 21/24* (2013.01);
(Continued)

(58) Field of Classification Search
CPC ...... G07C 9/00309; G07C 2009/00412; G07C 2009/00769; E05B 47/0012;
(Continued)

(56) References Cited

U.S. PATENT DOCUMENTS 9,449,448 B2 * 9/2016 Andersen ................. G07C 9/27
9,460,480 B2 * 10/2016 Woodard ................. G07F 9/002
(Continued)

FOREIGN PATENT DOCUMENTS

CN    203224924 U    10/2013
CN    103383214 A    11/2013
(Continued)

OTHER PUBLICATIONS

International Search Report in PCT/CN2020/107512 dated Nov. 9, 2020, 8 pages.
(Continued)

*Primary Examiner* — Nam V Nguyen
(74) *Attorney, Agent, or Firm* — METIS IP LLC

(57) ABSTRACT

The present disclosure discloses a method for controlling a smart lock. The method includes obtaining a control request for a smart lock, wherein the control request carries ciphertext information; decrypting the ciphertext information in response to the control request; and controlling the smart lock to perform a target operation based on a decrypted control request.

20 Claims, 18 Drawing Sheets

Related U.S. Application Data continuation of application No. PCT/CN2020/107512, filed on Aug. 6, 2020.

(30) Foreign Application Priority Data

Aug. 13, 2019 (CN) .......................... 201910743646.1
Aug. 14, 2019 (CN) .......................... 201910749249.5

(51) Int. Cl.
*E05B 47/00* (2006.01)
*G08B 21/24* (2006.01)
*H04W 4/021* (2018.01)
*H04W 4/02* (2018.01)

(52) U.S. Cl.
CPC ........... *H04W 4/021* (2013.01); *H04W 4/025* (2013.01); *H04W 4/80* (2018.02); *E05B 2047/0067* (2013.01); *G07C 2009/00412* (2013.01); *G07C 2009/00769* (2013.01)

(58) Field of Classification Search
CPC ........... E05B 2047/0067; G08B 21/24; H04W 4/021; H04W 4/025; H04W 4/80
USPC .................................. 340/5.7, 5.71, 5.72, 6.1
See application file for complete search history.

(56) References Cited

U.S. PATENT DOCUMENTS

| | | | | |
|---|---|---|---|---|
| 9,600,949 | B2* | 3/2017 | Conrad | H04W 12/06 |
| 9,613,478 | B2* | 4/2017 | Dumas | G07C 9/257 |
| 9,741,186 | B1* | 8/2017 | Lemke | H04W 12/069 |
| 9,875,589 | B1* | 1/2018 | Buttolo | G07C 9/00571 |
| 9,953,479 | B1* | 4/2018 | Sawant | G07F 11/62 |
| 10,528,087 | B2* | 1/2020 | Kang | A47F 3/0426 |
| 10,650,626 | B2* | 5/2020 | Shadid | G07C 9/00571 |
| 10,769,873 | B1* | 9/2020 | Sun | H04L 9/3247 |
| 11,085,226 | B2* | 8/2021 | Honjo | G07C 9/37 |
| 11,164,411 | B2* | 11/2021 | Kuenzi | G07C 9/00904 |
| 11,197,463 | B2* | 12/2021 | Burton | E06B 7/32 |
| 11,538,298 | B2* | 12/2022 | Li | E05B 47/0012 |
| 2012/0169453 | A1 | 7/2012 | Bryla et al. | |
| 2014/0265359 | A1 | 9/2014 | Cheng et al. | |
| 2017/0140592 | A1* | 5/2017 | Plüss | G07C 9/0069 |
| 2017/0193724 | A1 | 7/2017 | Johnson et al. | |
| 2017/0302779 | A1 | 10/2017 | Zhao et al. | |
| 2018/0130273 | A1* | 5/2018 | Eid | G07C 9/00309 |
| 2018/0247568 | A1* | 8/2018 | Wang | G09B 29/12 |
| 2019/0362574 | A1 | 11/2019 | Tang | |
| 2020/0028672 | A1 | 1/2020 | Tang | |
| 2020/0219347 | A1* | 7/2020 | Lv | E05B 47/0002 |
| 2020/0347643 | A1* | 11/2020 | Burke | E05B 47/02 |

FOREIGN PATENT DOCUMENTS

| | | |
|---|---|---|
| CN | 103953222 A | 7/2014 |
| CN | 104167040 A | 11/2014 |
| CN | 104680630 A | 6/2015 |
| CN | 104806085 A | 7/2015 |
| CN | 104895416 A | 9/2015 |
| CN | 104966336 A | 10/2015 |
| CN | 105118127 A | 12/2015 |
| CN | 204965562 U | 1/2016 |
| CN | 105303651 A | 2/2016 |
| CN | 105370106 A | 3/2016 |
| CN | 105447936 A | 3/2016 |
| CN | 205153744 U | 4/2016 |
| CN | 105590363 A | 5/2016 |
| CN | 105608772 A | 5/2016 |
| CN | 105631987 A | 6/2016 |
| CN | 105672777 A | 6/2016 |
| CN | 105788042 A | 7/2016 |
| CN | 105931330 A | 9/2016 |
| CN | 205688975 U | 11/2016 |
| CN | 106320852 A | 1/2017 |
| CN | 205862394 U | 1/2017 |
| CN | 206133015 U | 4/2017 |
| CN | 106609605 A | 5/2017 |
| CN | 206271192 U | 6/2017 |
| CN | 106934884 A | 7/2017 |
| CN | 106996223 A | 8/2017 |
| CN | 107358693 A | 11/2017 |
| CN | 107419968 A | 12/2017 |
| CN | 206757047 U | 12/2017 |
| CN | 107831990 A | 3/2018 |
| CN | 108179925 A | 6/2018 |
| CN | 108222674 A | 6/2018 |
| CN | 108537929 A | 9/2018 |
| CN | 108678558 A | 10/2018 |
| CN | 108811178 A | 11/2018 |
| CN | 108922000 A | 11/2018 |
| CN | 109064612 A | 12/2018 |
| CN | 109147119 A | 1/2019 |
| CN | 109236054 A | 1/2019 |
| CN | 208433033 U | 1/2019 |
| CN | 109389714 A | 2/2019 |
| CN | 109523664 A | 3/2019 |
| CN | 109816832 A | 5/2019 |
| CN | 109830006 A | 5/2019 |
| CN | 109854093 A | 6/2019 |
| CN | 109972915 A | 7/2019 |
| CN | 109972923 A | 7/2019 |
| CN | 209149424 U | 7/2019 |
| EP | 0345372 A1 | 12/1989 |
| JP | 2016000916 A | 1/2016 |
| WO | 2016007877 A1 | 1/2016 |
| WO | 2016023558 A1 | 2/2016 |
| WO | 2017092038 A1 | 6/2017 |
| WO | 2019077366 A1 | 4/2019 |

OTHER PUBLICATIONS

First Office Action in Chinese Application No. 201910722281.4 dated May 17, 2021, 22 pages.
First Office Action in Chinese Application No. 201910730428.4 dated Jun. 17, 2021, 23 pages.
First Office Action in Chinese Application No. 201910743646.1 dated Jun. 25, 2021, 22 pages.
The Second Office Action in Chinese Application No. 201910743646.1 dated Oct. 29, 2021, 24 pages.
First Office Action in Chinese Application No. 201910749249.5 dated Jun. 29, 2021, 23 pages.

\* cited by examiner

1200

```
Decrypting the ciphertext information in
response to the control request to obtain the      ~1210
locking instruction for the smart door lock
                    │
                    ▼
Detecting whether the lock body installed with     ~1220
the smart door lock is in the closed state
                    │
                    ▼
Controlling the smart door lock to perform the
automatic locking operation when the door          ~1230
body is detected in the closed state
```

DEVICES AND METHODS FOR CONTROLLING SMART LOCK

CROSS-REFERENCE TO RELATED APPLICATIONS

This application is a continuation of U.S. patent application Ser. No. 17/454,624, filed on Nov. 12, 2021, which claims priority to International Application No. PCT/CN2020/107512 filed on Aug. 6, 2020, which claims priority to Chinese Application No. 201910722281.4 filed on Aug. 6, 2019, Chinese No. 201910730428.4 filed on Aug. 8, 2019, Chinese Application No. 201910743646.1 filed on Aug. 13, 2019 and Chinese Application No. 201910749249.5 filed on Aug. 14, 2019, the entire contents of each of which are hereby incorporated by reference.

TECHNICAL FIELD

The present disclosure relates to a smart locks field, and in particular, to devices and methods for controlling a smart lock.

BACKGROUND

With the progress and development of science and technology, smart lock has entered the public's daily life. The smart lock is widely used in access control system, home equipment, security and other fields because of its security and convenience. How to conveniently realize the state detection and the security control of the smart door lock has attracted more and more attention.

Therefore, it is desirable to provide a method and a system for controlling a smart lock with high security.

SUMMARY

According to some embodiments of the present disclosure, a method for controlling a smart lock is provided. The method includes: obtaining a control request for a smart lock, wherein the control request carries ciphertext information; decrypting the ciphertext information in response to the control request; and controlling the smart lock to perform a target operation based on a decrypted control request.

In some embodiments, the ciphertext information may be obtained by performing at least one of following encryption operations on at least part of the control request: a symmetric encryption algorithm and an asymmetric encryption algorithm. the decrypting the ciphertext information includes:

In some embodiments, the decrypting the ciphertext information may include decrypting the ciphertext information based on a decryption key corresponding to an encryption key of the ciphertext information to obtain the decrypted control request.

In some embodiments, the smart lock may include an encryption chip for storing the decryption key.

In some embodiments, the decrypted control request may include at least a control instruction and a timestamp, wherein the timestamp is configured to indicate a validity time of the control instruction.

In some embodiments, the controlling the smart lock to perform the target operation based on the decrypted control request may include: determining a current time; and determining whether the current time matches the timestamp, if the current time matches the timestamp, controlling the smart lock to perform the target operation.

In some embodiments, the smart lock may include a clock chip, and the determining the current time may include: sending a current time acquisition request to the clock chip; and obtaining a time returned by the clock chip as the current time.

In some embodiments, the time returned by the clock chip may be a time corrected by a network time protocol.

In some embodiments, the controlling the smart lock to perform the target operation based on the decrypted control request may include: controlling the smart lock to perform an automatic unlocking operation when the control request is to control the smart lock to unlock; and controlling the smart lock to perform an automatic locking operation when the control request is to control the smart lock to lock.

In some embodiments, the method may further comprise: obtaining state information, wherein the state information reflects a state of the smart lock and/or a door body on which the smart lock is installed before and/or after the target operation.

In some embodiments, the smart lock may include a first sensor, wherein the first sensor may be configured to detect angle information of a square shaft of a smart lock body, and the obtaining the state information of the smart lock may include: obtaining first collected data of the first sensor; and determining the state information of the smart lock based on the first collected data.

In some embodiments, the smart lock may include a second sensor, wherein the second sensor may be configured to detect a dynamic/static state of the square shaft of the smart lock body, and the obtaining the state information of the smart lock further may include: obtaining second collected data of the second sensor; determining the dynamic/static state of the square shaft of the smart lock body based on the second collected data; and waking up the first sensor when the dynamic/static state of the smart lock body indicates that the square shaft changes from a static state to a rotating state.

In some embodiments, the angle information may include at least one of following: a position of the square shaft of the smart lock body, a rotation displacement of the square shaft of the smart lock body, and a rotation angle of the square shaft of the smart lock body.

In some embodiments, the smart lock may include a third sensor, wherein the third sensor may be configured to detect a retraction angle of a driving part of the smart lock, wherein the driving part may be configured to drive a movement of the square shaft of the smart lock body, and the obtaining the state information of the smart lock further may include: obtaining third collected data of the third sensor; determining the retraction angle of the driving part based on the third collected data; controlling the driving part to stop rotating when the retraction angle of the driving part meets a preset angle threshold; and controlling the driving part to keep retracting to reach the preset angle threshold when the retraction angle of the driving part does not meet the preset angle threshold.

In some embodiments, the door body may include a fourth sensor, wherein the fourth sensor may be configured to detect position information of the door body, and obtaining a state of the door body includes: obtaining fourth collected data of the fourth sensor; and determining the state of the door body based on the fourth collected data In some embodiments, the fourth sensor may include a geomagnetic sensor or a gyro sensor.

In some embodiments, the determining the state of the door body based on the fourth collected data may include: determining that the door body is in a closed state when the fourth collected data matches a first threshold; determining that the door body is in an open state when the fourth collected data matches a second threshold.

In some embodiments, the determining the state of the door body based on the fourth collected data may include: determining that the door body is in the closed state when the value of the fourth collected data is within a preset interval; otherwise, determining that the door body is in the open state.

In some embodiments, the door body may further include an acceleration sensor, and the determining the state of the door body may further include: determining an acceleration of the door body based on collected data of the acceleration sensor; and obtaining the fourth collected data of the fourth sensor when the acceleration is greater than a preset acceleration threshold.

In some embodiments, the determining the state of the door body based on the fourth collected data may include: obtaining and recording the fourth collected data of the fourth sensor at the same time when the acceleration is greater than the preset acceleration threshold; and controlling the fourth sensor to be in a sleep state when a recording time exceeds a preset time.

In some embodiments, the determining the state of the door body based on the fourth collected data may include: controlling the fourth sensor to be in the sleep state when the acceleration is less than the preset acceleration threshold within the preset time.

In some embodiments, the method may further include: determining whether the state information satisfies the control instruction in the control request; generating a linkage instruction of an associated device when the control instruction is not satisfied, wherein the linkage instruction of the associated device is configured to control an imaging device associated with the smart lock to turn on; and sending the linkage instruction of the associated device to the imaging device.

In some embodiments, the controlling the smart lock to perform the target operation based on the decrypted control request when the control request is to control the smart lock to lock may include: detecting whether the door body installed with the smart lock is in the closed state; and controlling the smart lock to perform the automatic locking operation when the door body is detected in the closed state.

In some embodiments, the method may further include: generating alarm information when the door body is detected in the open state; and sending the alarm information to a terminal device to remind a user that the door body is in the open state.

In some embodiments, the method may further include: generating the linkage instruction of the associated device when the door body is detected in the open state, wherein the linkage instruction of the associated device is configured to control the imaging device associated with the smart lock to turn on; and sending the linkage instruction of the associated device to the imaging device.

In some embodiments, the method may further include: generate locking information; and sending the locking information to the terminal device to remind a user that the door body is in the closed state.

In some embodiments, before the obtaining the control request for the smart lock may include: receiving a wireless signal of a target terminal device, wherein the target terminal device is a terminal device that establishes a wireless connection with the smart lock; determining whether a preset condition is met based on the wireless signal of the target terminal device; and instructing the target terminal device to send the control request for the smart lock when the preset condition is met.

In some embodiments, the determining whether a preset condition is met based on the wireless signal of the target terminal device may include: determining whether a motion state of the target terminal device is a first motion state based on the wireless signal of the target terminal device, wherein the first motion state is close to the smart lock; determining whether the target terminal device is within a preset range based on the wireless signal of the target terminal device when the motion state is the first motion state; and determining the preset condition is met when the target terminal device is within the preset range.

In some embodiments, the determining whether the motion state of the target terminal device is the first motion state based on the wireless signal of the target terminal device may include: determining a first distance between the target terminal device and the smart lock based on a first wireless signal of the target terminal device; determining a second distance between the target terminal device and the smart lock based on a second wireless signal of the target terminal device, wherein a reception time of the second wireless signal is later than the reception time of the first wireless signal; determining the motion state of the target terminal device is the first motion state when the first distance is less than the second distance; and determining the motion state of the target terminal device is the second motion state when the first distance is larger than the second distance, wherein the second motion state is away from the smart lock.

In some embodiments, the determining whether the target terminal device is within the preset range based on the wireless signal of the target terminal device may include: obtaining a third wireless signal of the target terminal device; determining a third distance between the target terminal device and the smart lock based on the third wireless signal of the target terminal device; determining whether the third distance is less than or equal to a preset distance; and determining the target terminal device is within the preset range when the third distance is less than or equal to a preset distance.

In some embodiments, the wireless signal may include a Bluetooth signal.

Another aspect of the present disclosure may provide a method for controlling a smart lock implemented to a server. The method may include: obtaining a remote control instruction, wherein the remote control instruction is generated by a terminal device in response to a remote target operation input by a user; obtaining a smart lock identifier corresponding to the remote control instruction; generating a control request for a smart lock carrying ciphertext information; and sending the control request to the smart lock corresponding to the smart lock identifier.

Another aspect of the present disclosure may provide a method for controlling a smart lock implemented to a terminal device. The method may include: determining whether the terminal device meets a preset wireless signal transmission condition; and sending a wireless signal to the smart lock if the preset wireless signal transmission condition is met so that when the smart lock determines that the preset condition is met based on the wireless signal, instructing the terminal device to send the control request for the smart lock; and sending the control request for the smart lock to the smart lock so that the smart lock controls the smart lock to perform a target operation based on the control request for the smart lock.

In some embodiments, the determining whether the terminal device meets the preset wireless signal transmission condition may include: obtaining a current geographical location of the terminal device; determining whether the current geographic location is within a preset geographic location area; and determining the terminal device meets the preset wireless signal transmission condition if the current geographic location is within the preset geographic location area.

In some embodiments, the determining whether the terminal device meets the preset wireless signal transmission condition includes: obtaining an identification of a Wi-Fi signal detected by the terminal device; determining whether the identification includes the identification of a target Wi-Fi signal; and determining the terminal device meets the preset wireless signal transmission condition if the identification includes the identification of the target Wi-Fi signal.

In some embodiments, the method may further include: sending the remote control instruction to the server when the terminal device meets the preset wireless signal transmission condition and fails to successfully establish a wireless communication connection with the smart lock within a preset time range.

In some embodiments, the sending the wireless signal to the smart lock may include: sending a Bluetooth signal to the smart lock.

Another aspect of the present disclosure may provide a device for controlling a smart lock. The device may include: a first obtaining unit configured to obtain a control request for a smart lock, wherein the control request carries ciphertext information; a decryption unit configured to decrypt the ciphertext information in response to the control request; and an execution unit configured to control the smart lock to perform a target operation based on a decrypted control request.

In some embodiments, the device may further comprise a second obtaining unit, wherein the second obtaining unit is configured to: obtain state information, wherein the state information may reflect a state of the smart lock and/or a door body on which the smart lock is installed before and/or after the target operation.

In some embodiments, the device may further comprise a control unit, the smart lock may include a third sensor, wherein the third sensor may be configured to detect a retraction angle of a driving part of the smart lock, wherein the driving part may be configured to drive a movement of the square shaft of the smart lock body; the second obtaining unit may be configured to: obtain third collected data of the third sensor; determine a retraction angle of the driving part based on the third collected data; the control unit may be configured to: control the driving part to stop rotating when the retraction angle of the driving part meets a preset angle threshold; control the driving part to keep retracting to reach the preset angle threshold when the retraction angle of the driving part does not meet the preset angle threshold.

In some embodiments, the device may further comprise a wireless interaction unit, wherein the wireless interaction unit is configured to: receive a wireless signal of a target terminal device, wherein the target terminal device is a terminal device that establishes a wireless connection with the smart lock; determine whether a preset condition is met based on the wireless signal of the target terminal device; and instruct the target terminal device to send the control request for the smart lock when the preset condition is met.

Another aspect of the present disclosure may provide a device for controlling a smart lock. The device may include: a third obtaining unit configured to obtain a remote control instruction, wherein the remote control instruction may be generated by a terminal device in response to a remote target operation input by a user; and obtain a smart lock identifier corresponding to the remote control instruction; a request generation unit configured to generate a control request for a smart lock carrying ciphertext information; and a first transmission unit configured to send the control request to the smart lock corresponding to the smart lock identifier.

Another aspect of the present disclosure may provide a device for controlling a smart lock implemented to a terminal device. The device may include: a determination unit configured to determine whether a terminal device meets a preset wireless signal transmission condition; a wireless transmission unit configured to send a wireless signal to a smart lock if the preset wireless signal transmission condition is met so that when the smart lock determines that the preset condition is met based on a wireless signal, instructing the terminal device to send a control request for the smart lock; and a second transmission unit configured to send the control request for the smart lock to the smart lock so that the smart lock controls the smart lock to perform a target operation based on the control request for the smart lock.

According to some embodiments of the present disclosure, a non-transitory computer-readable storage medium is provided. The non-transitory computer-readable storage medium includes instructions that, when executed by at least one processor, direct the at least processor to perform the method for controlling a smart lock.

According to some embodiments of the present disclosure, a system for controlling a smart lock is provide, the system includes: a storage device for storing a set of instructions; one or more processors communicating with the storage device; when the instruction is executed, the one or more processors are made to implement the method as described above.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 12 is a flowchart illustrating another exemplary process for controlling the smart lock according to some embodiments of the present disclosure;

DETAILED DESCRIPTION

Figure 1:
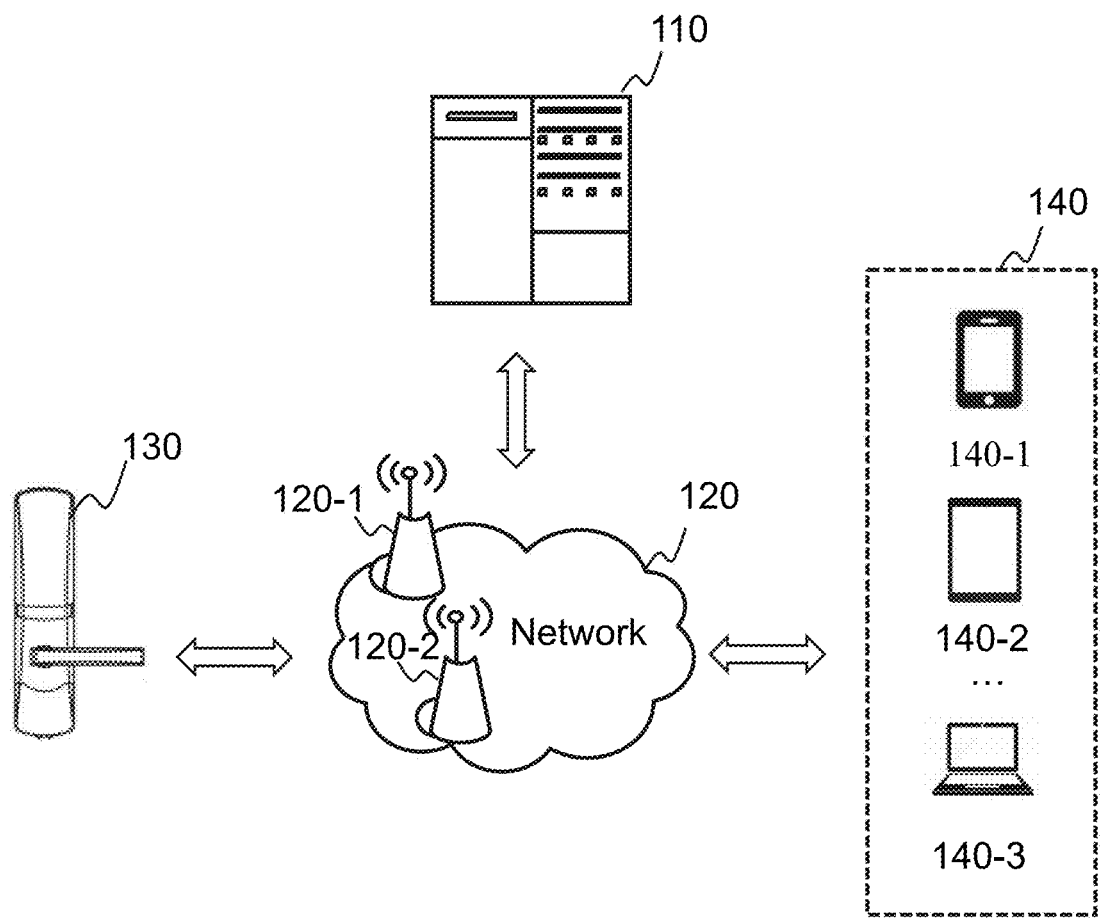
FIG. 1 is a schematic diagram illustrating an exemplary scenario of a system for controlling a smart lock.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "unit," "module," and/or "block" used herein are one method to distinguish different components, elements, parts, sections, or assemblies of different levels in ascending order. However, the terms may be displaced by another expression if they achieve the same purpose.

The terminology used herein is for the purpose of describing example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

A method for controlling a smart lock in some embodiments of the present disclosure may process one or more kinds of information and/or data such as a control request for the smart lock, a terminal device connected with the smart lock, the smart lock, a door body (or other devices) installed with the smart lock, to improve the convenience and the security of the smart lock. In some embodiments, the distance relationship between a target terminal device and the smart lock may be determined based on a wireless signal sent by the target terminal device connected with the smart lock, and then the smart lock may be controlled, which may improve the convenience of smart lock control. In some embodiments, the smart lock control request may be encrypted, the ciphertext information of the control request may be obtained by decryption, and the smart lock may be controlled based on the ciphertext information, which may improve the security of the smart lock control. In some embodiments, the smart lock may be controlled based on a current state of the door body (or other devices) on which the smart lock is installed. When it is detected that the current state of the door body does not meet the instruction requirements of the control request, warning and/or opening the imaging device associated with the smart lock may improve the security of the use of the smart lock. In some embodiments, after executing the control request for the smart lock, the state information of the smart lock and/or door body may be obtained and sent to the user terminal device, so that the user may understand the current state of the door lock.

FIG. 1 is a schematic diagram illustrating an exemplary scenario of a system for controlling the smart lock.

As shown in FIG. 1, the scenario of the system for controlling the smart lock 100 may include: a server 110, a network 120, the smart lock 130 and the terminal device 140. The network 120 may be a medium for providing a communication a link between the server 110, the smart lock 130 and the terminal device 140. The network 120 may include various connection types, such as wired communication links, wireless communication links, optical fiber cables, or the like.

The user may interact with the server 110 through the network 120 using the terminal device 140 to receive or send messages or the like. Various client applications, such as remote control applications, may be installed on the terminal device 140. In some embodiments, the network 120 may be any one of a wired network or a wireless network, or any combination thereof. As an example only, the network 120 may include a cable network, a wired network, an optical fiber network, a remote communication network, an intranet, the Internet, a local area network (LAN), a wide area network (WAN), a wireless local area network (WLAN), a metropolitan area network (man), a wide area network (WAN), a public switched telephone network (PSTN), a Bluetooth network, a Zigbee network, a near field communication (NFC) network, or any combination of the above examples. The smart lock 130 and the server 110 may communicate directly through the network 120 or connect through the Internet of things gateway (not shown in FIG. 1). For example, the communication between the smart lock 130 and the Internet of things gateway may be based on a ZigBee protocol, and the communication between the Internet of things gateway and the server 110 may be based on a cellular mobile network or a Wi Fi network. The smart lock 130 and the terminal device 140 may also be based on short-range wireless communication, including but not limited to a Bluetooth protocol communication, a near-field communication (NFC), an infrared communication, or the like.

The terminal device 140 may be a hardware or a software. When the terminal device 140 is hardware, it may be various electronic devices with display screens, including but not limited to a smart phone 140-1, a tablet 140-2, a laptop 140-3, a desktop computer, or the like. When the terminal device 140 is software, it may be installed in the electronic devices listed above. It may be implemented as multiple software or software modules (for example, to provide distributed services) or as a single software or a software module. There are no specific restrictions here.

The server 110 may be a server providing various services. For example, in response to receiving s remote control instruction sent by the terminal device 140, the server 110 may analyze and process the remote control instruction, obtain the remote control request, and send the remote control request to the smart lock 130 to enable the user to realize the remote control of the smart lock 130. In some embodiments, the terminal device 140 may be used to generate the remote control instruction in response to a remote target operation input by the user and send the remote control instruction to the server 110. The server 110 may be configured to receive the remote control instruction, obtain the smart lock identification corresponding to the remote control instruction, generate a remote control request carrying ciphertext information, and send the remote control request and the smart lock identification to an Internet of things gateway, so that the Internet of things gateway may send the remote control request to the smart lock 130 corresponding to the smart lock identification. The smart lock 130 may be configured to execute the method for controlling the smart lock disclosed in the present application.

It should be noted that the server 110 may be a hardware or a software. When the server is hardware, it may be realized as a distributed server cluster composed of multiple servers or as a single server. When the server is software, it may be implemented as multiple software or software modules (for example, to provide distributed services), or as a single software or a software module. There are no specific restrictions here.

It should be noted that the method for controlling the smart lock provided by the embodiment of the application may be generally performed by the smart lock 130. Accordingly, the device for controlling the smart lock may be generally set in the smart lock 130. The method for controlling the smart lock applied to the server provided by the embodiment of the application may be generally executed by the server 110. Accordingly, the device for controlling the smart lock applied to the server may be generally arranged in the server 110. In some embodiments, the server 110 may be located inside the smart lock 130, and the smart lock 130 and the server 110 may be connected through an internal wired network. In some embodiments, the server 110 may also be in a cloud and connected to the smart lock 130 through a wireless network. Some or all the operations of some modules in the smart lock 130 may be completed by the server 110.

It should be understood that the count of the terminal devices, the networks and the servers in FIG. 1 may be only schematic. According to the implementation needs, there may be any count of the terminal devices, the networks, and the servers. For ease of understanding, in the embodiment of this specification, the application of the smart lock 130 to the door lock device may be mainly described as an example. It should be noted that the embodiment of the smart lock applied to the door lock device in this specification may be only an example and may not by a limitation of this specification. For example, the smart lock may also be used for gate devices, traffic devices, or the like.

Figure 2:
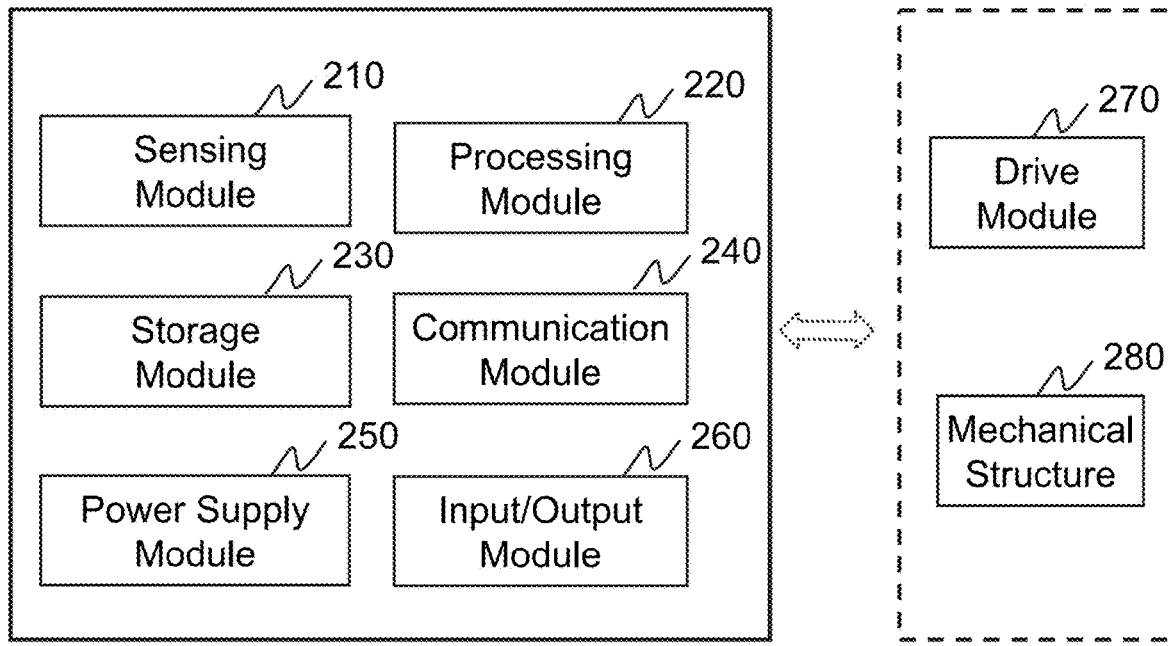
FIG. 2 is a schematic diagram illustrating an exemplary hardware and/or software of the system for controlling the smart lock according to some embodiments of the present disclosure.

FIG. 2 is a schematic diagram illustrating an exemplary hardware and/or software of the system for controlling the smart lock according to some embodiments of the present disclosure.

As shown in FIG. 2, the system for controlling the smart lock 200 may include a sensing module 210, a processing module 220, a storage module 230, a communication module 240, a power supply module 250 and an input/output module 260. It should be noted that the modules, the units, and the sub units mentioned in the application may be realized by the hardware, the software or a combination of the software and the hardware. Among them, the implementation mode of the hardware may include using a circuit or a structure composed of physical components. The implementation of the software may include storing the corresponding operations of the module, the units and the sub unit in the memory in the form of code and executed by appropriate hardware, such as a microprocessor. When the modules, the units and the sub units mentioned in the present disclosure perform the operations, if there is no special description, it may mean that either the software code containing the function is executed or the hardware with the function is used. Meanwhile, the modules, the units and the sub units mentioned in the present disclosure may not limit the structure of the corresponding hardware when corresponding to the hardware, as long as the hardware that may realize the functions is within the protection scope of the present disclosure. For example, the different modules, the units and the sub units mentioned in the present disclosure may correspond to the same hardware structure. For another example, the same module, unit and sub unit mentioned in the present disclosure may also correspond to the multiple independent hardware structures.

The sensing module 210 may be configured to sense a state or actions of the smart lock and the door or other device installed with the smart lock, such as a door opening action, an opening state, a door closing action, a closing state and other states. The closed state may refer to the state that the door panel and the door frame are located in the same plane. The open state may refer to the state that the door panel and the door frame are not in the same plane. Other states may refer to the error state when the sensing module 210 may not accurately perceive the accurate state of the door. The door opening action may be an action from the closed state to the open state. The closing action may be an action from the open state to the closed state. In some embodiments, the sensing module 210 may include at least one of an angle sensor, a Hall sensor, a gyroscope sensor, an accelerometer, a geomagnetic sensor, or the like. In some embodiments, the sensing module 210 may also include a voltage detector, which may be configured to detect the voltage or a level state (a high level or a low level) of one or more components (such as the gyroscope sensors) in the system for controlling the smart lock 200 and send the detected voltage or the level state to the processing module 220 and/or the storage module 230. In some embodiments, the sensing module 210 may also include other types of sensing elements, such as infrared sensors, magnetic field sensors, contact sensors, vision sensors, pressure sensors, or the like.

The processing module 220 may be configured to process the information and the data related to the system for controlling the smart lock 200 to perform one or more functions described in the present disclosure. For example, the processing module 220 may control the geomagnetic sensor to enter a sleep state based on detecting that the door is closed and remains for a preset time (also referred to as the first preset time in the present disclosure). As another example, the processing module 220 may generate alarm information based on detecting that the door is open. As an example only, the processing module 220 may include a central processing unit (CPU), an application specific integrated circuit (ASIC), an application specific instruction set processor (ASIP), an image processing unit (GPU), a physical operation processing unit (PPU), a digital signal processor (DSP), a field programmable gate array (FPGA), a programmable logic device (PLD), a controller, a microcontroller unit (MCU), a reduced instruction set computer (RISC), a microprocessor, or the like, or any combination thereof. In some embodiments, the processing module 220 may include an input/output interface. The processing module 220 may receive the information and/or the data from one or more modules (e.g., the sensing module 210, the storage module 230) of the system for controlling the smart lock 200 through the input/output interface, or send the information and/or the data to one or more modules (e.g., the sensing module 210, the storage module 230) of the system for controlling the smart lock 200. In some embodiments, the input/output interface may be integrated into the communication module 240, and the processing module 220 may exchange the information and/or the data with one or more modules (e.g., the sensing module 210, the storage module 230) of the system for controlling the smart lock 200 through the communication module 240.

The processing module 220 may process the data from the sensing module 210, the storage module 230, the communication module 240, the power supply module 250, and/or the input/output module 260. For example, the processing module 220 may compare the position information of the door obtained by the sensing module 210 with the preset value to determine whether the state of the door meets the requirements of the control instructions. As another example, the processing module 220 may process the instructions or the operations from the input/output module 260. In some embodiments, the processed data may be stored in the memory or the hard disk. In some embodiments, the processing module 220 may transmit the processed data to one or more components in the system for controlling the smart lock 200 through the communication module 240 or the network 120. For example, the processing module 220 may send an associated device linkage instructions to the control module 230, and the control module 230 may control the imaging device to turn on according to the linkage instructions. For example, after the processing module 220 obtains the unlocking control instruction by decrypting the ciphertext information of the control request, the control module 230 may send the instruction to the drive module 270 to control the door lock to unlock.

The processing module 220 may be associated with other modules in the system. In some embodiments, the processing module 220 may control the operation state of other modules in the system (e.g., the communication module 240, the power supply module 250, the input/output module 260, the drive module 270). For example, the processing module 220 may control the operation state of the sensing module 210 according to the detection result of the current state of the door, such as controlling the sensing module 210 to enter the sleep state. As another example, after the processing module 220 obtains that the driving part of the smart lock does not reach the normal return angle, the processing module 220 may control the operation state of the driving module 270 to reach the return angle. As another example, the processing module 220 may control a power supply state (e.g., a normal mode, a power saving mode), a power supply time, or the like, of the power supply module 250. When the remaining power of the power supply module 250 reaches a certain threshold (e.g., 10%), the processing module 220 may control the power supply module 250 to enter the power saving mode or connect with an external power supply for charging. As another example, the processing module 220 may also control the operation state of the communication module 240. When the current state of the smart lock and/or door does not meet the control request, the processing module 220 may control the communication module 240 to send out reminder information or alarm information.

The storage module 230 may be configured to store the instructions and/or the data of each module (e.g., the sensing module 210, the processing module 220) of the system for controlling the smart lock 200. For example, the storage module 230 may store the state of the door. As another example, the storage module 230 may store the opening angle when the door is in the open state. In some embodiments, the storage module 230 may include a mass memory, a removable memory, a volatile read-write memory, a read-only memory (ROM), or the like, or any combination thereof. An exemplary mass storage may include magnetic disks, optical disks, solid-state disks, or the like. An exemplary removable memory may include flash drives, floppy disks, optical disks, memory cards, compressed disks, magnetic tapes, or the like. An exemplary volatile read-write memory may include a random-access memory (RAM). An exemplary random-access accessor may include a dynamic random-access memory (DRAM), a double rate synchronous dynamic random-access memory (DDRSDRAM), a static random-access memory (SRAM), a thyristor random-access memory (T-RAM), a zero-capacitance random-access memory (z-ram), or the like. An exemplary read only memory may include a mask read only memory (MROM), a programmable read only memory (PROM), an erasable programmable read only memory (EPROM), an electronically erasable programmable read only memory (EEPROM), a compressed disk read only memory (CD-ROM), a digital universal disk read only memory, or the like. In some embodiments, the storage module 230 may be implemented on a cloud platform. For example, the cloud platform may include a private cloud, a public cloud, a hybrid cloud, a community cloud, a distributed cloud, an interconnected cloud, a multi cloud, or the like, or any combination thereof.

The communication module 240 may be used for a signal transmission between modules (e.g., the sensing module 210, the processing module 220, the storage module 230) of the system for controlling the smart lock 200. In some embodiments, the communication module 240 may also establish communication with a user (e.g., the terminal device of the user, or the like) to feedback the state of the door. For example, when the owner enters the door, but the door is still open within 1 minute, the communication module 240 may send information to remind the user, such as "the door is open". In some embodiments, the communication module 240 may also be configured to send a prompt or an alarm signal to the user (e.g., the terminal device of a property or a community, or the like). For example, when the door is continuously open within 1 hour, the communication module 240 may send an alarm signal to the smart terminal device of the property or the community.

In some embodiments, the communication module 240 may be used for the exchange of the information or the data. In some embodiments, the communication module 240 may be used for the communication between the internal components of the smart lock 130 (e.g., the sensing module 210, the processing module 220, the storage module 230, the power supply module 250, the input/output module 260, and/or the drive module 270). For example, the sensing module 210 may send the information (e.g., the first collected data, the second collected data, the third collected data, the fourth collected data, or the like) to the communication module 240, which may send the information to the processing module 220. In some embodiments, the communication module 240 may also be used for the communication between the smart lock 130 and other components in the scenario of the system for controlling the smart lock 100 (e.g., the server 110, the terminal device 140). For example, the communication module 240 may exchange the information with the server 110 or the terminal device 140 through the network 120. As an example, the communication module 240 may send the state information (e.g., a switching state) of the smart lock 130 to the server 110, which may monitor the smart lock 130 based on the state information. The communication module 240 may adopt wired, wireless and wired/wireless hybrid technologies. The wired technology may be based on one or more optical cable combinations such as metal cables, hybrid cables, optical cables, or the like. The wireless technologies may include a Bluetooth, a Wi-Fi, a ZigBee, a near field communication (NFC), a radio frequency identification (RFID), a cellular network (including a GSM, a CDMA, a 3G, a 4G, a 5G, or the like), a narrow band Internet (NBIoT) based on a cellular, or the like. In some embodiments, the communication module 240 may code and process the transmitted information in one or more coding modes, for example, the coding modes may include a phase coding, a non-return to zero coding, a differential Manchester coding, or the like. In some embodiments, the communication module 240 may select different transmission and coding methods according to the data type or the network type to be transmitted. In some embodiments, the communication module 240 may include one or more communication interfaces for different communication modes. In some embodiments, the other modules illustrated in the system for controlling the smart lock 200 may be dispersed on a plurality of the devices. In some embodiments, the other modules may include one or more communication modules 240 respectively for the information transmission between modules. In some embodiments, the communication module 240 may include a receiver and a transmitter. In other embodiments, the communication module 240 may be a transceiver. In some embodiments, the communication module 240 may also have a reminder or/and an alarm function. For example, when the door body is closed in the case of locking, the communication module 240 may send the reminder or the alarm message to the user. In some embodiments, the alarm mode may include a sound alarm, a light alarm, a remote alarm, or the like, or any combination thereof. For example, when the alarm mode is the remote alarm, the communication module 240 may send the reminder information or the alarm information to an associated user terminal device, and the communication module 240 may also establish the communication between the smart door lock and the associated user terminal device (such as a voice call, a video call).

The power supply module 250 may be configured to supply power to the system for controlling the smart lock 200. The power supply module 250 may include a battery, a farad capacitor, or the like. In some embodiments, the battery may be connected in parallel with the farad capacitor and the sensor. When the battery is charged, the battery may supply the power to the farad capacitor and the sensor. The farad capacitor may supply the power to the sensor when the battery is dead or powered off (for example, replacing the battery). In some embodiments, a diode or other circuit components that can limit the flow of the current may be connected between the battery and the farad capacitor, so that when the battery is dead or the battery is replaced, the farad capacitor may not supply the power to the battery, but may be configured to supply the power to the sensor to ensure that the sensor may enter or maintain the working state.

In some embodiments, the power supply module 250 may provide the power to other components in the system for controlling the smart lock 200 (e.g., the sensing module 210, the processing module 220, the storage module 230, the communication module 240, the input/output module 260, the drive module 270). The power supply module 250 may receive a control signal from the processing module 220 to control the power output of the smart lock 130. For example, when the smart lock 130 does not receive any operation within a certain period (e.g., 1s, 2s, 3s or 4s), the power supply module 250 may only supply the power to the memory. For another example, when the smart lock 130 does not receive any operation within the certain period (e.g., 1s, 2s, 3s or 4s), the power supply module 250 may disconnect the power supply to other components, and the data in the system for controlling the smart lock 200 may be transferred to the hard disk to make the smart lock 130 enter the standby mode or the sleep mode. In some embodiments, the power supply module 250 may include at least one battery. The battery may include one or more combinations of dry cells, lead-acid batteries, lithium batteries, solar cells, wind power generation batteries, mechanical energy power generation batteries, or the like. The solar cells may convert a light energy into an electric energy and store the electric energy in the power supply module 250. The wind power generation batteries may convert a wind energy into the electric energy and store the electric energy in the power supply module 250. The mechanical energy generation batteries may convert a mechanical energy into the electrical energy and store the electrical energy in the power supply module 250. The solar cells may include a silicon solar cell, a thin film solar cell, a nanocrystalline chemical solar cell, a fuel sensitized solar cell, a plastic solar cell, or the like. The solar cells may be distributed on the smart lock 130 in the form of the battery panel. In some embodiments, when the power of the power supply module 250 is less than a power threshold (e.g., the power at 10%), the processing module 220 may send the control signal to a voice device (e.g., a speaker) of the smart lock 130. The control signal may control the voice device to send a voice reminder. The voice reminder may include the information that the power supply module 250 is low. In some embodiments, when the power of the power supply module 250 is less than the power threshold, the processing module 220 may send the control signal to the power supply module 250. The control signal may control the power supply module 250 to perform the charging operation. In some embodiments, the power supply module 250 may include a standby power supply. In some embodiments, the power supply module 250 may also include a charging interface. For example, the power supply module 250 may temporarily charge the power supply module 250 using portable electronic devices (e.g., mobile phones, tablets) or a portable battery in an emergency (e.g., the power of the power supply module 250 is 0, and the external power system may not supply power).

The input/output module 260 may obtain, transmit and send signals. The input/output module 260 may connect or communicate with other components in the system for controlling the smart lock 200. Other components in the system for controlling the smart lock 200 may be connected or communicated through the input/output module 260. The input/output module 260 may be described in other parts of the present disclosure for more details. The input/output module 260 may be a wired USB interface, a serial communication interface, a parallel communication port, a wireless Bluetooth, an infrared, a radio-frequency identification (RFID), a wlan authentication and privacy infrastructure (WAPI), a general packet radio service (GPRS), a code division multiple access (CDMA), or the like, or any combination thereof. In some embodiments, the input/output module 260 may be connected to the network 120 and obtain the information through the network 120. For example, the input/output module 260 may obtain and output the state information of the smart door lock and/or door body from the sensing module 210 through the network 120 or the communication module 240. Also, for example, the input/output module 260 may be connected through the network 120 or the communication module 240. In some embodiments, the input/output module 260 may include VCC, GND, RS-232, RS-485 (e.g., RS485-A, RS485-B) and a general network interface, or the like, or any combination thereof. In some embodiments, the input/output module 260 may code and process the transmitted signal in one or more coding modes. The coding modes may include the phase coding, the non-return to zero coding, the differential Manchester coding, or the like, or any combination thereof.

In some embodiments, the system for controlling the smart lock 200 may also include the drive module 270 (also referred to as a motor drive module) and a mechanical structure 280. In some embodiments, the drive module 270 may include one or more driving force sources or drive components. In some embodiments, the driving force source may include a driving motor driven by electricity. In some embodiments, the drive motor may be one or a combination of a DC motor, an AC induction motor, a permanent magnet motor, a switched reluctance motor, or the like, or any combination thereof. In some embodiments, the drive module 270 may include one or more drive motors. The processing module 220 may control the operation of the drive module 270, which may act on the mechanical structure 280 to complete the target operation. For example, the processing module 220 may issue an instruction containing the electrical signal containing a required operating state and a duration. The driving force source of the drive module 270 may be configured according to the electrical signal content (for example, the driving motor in the drive module 270 may rotate at a specific speed per minute for a specific time), and the rotation of the driving motor may drive the change of the state of the connected mechanical structure 280 (such as unlocking, locking, and starting). For another example, when the smart lock 130 is applied to a door lock device, after the user's identity is confirmed successfully, the drive module 270 may drive the mechanical structure 280 (e.g., a lock tongue) connected to the door lock device to unlock. For another example, when the smart lock 130 is applied to a gate device, after the user's identity is confirmed successfully, the drive module 270 may drive the mechanical structure 280 (e.g., a roller shaft, door) connected to the gate device to provide a passageway for the user. For another example, when the smart lock 130 is applied to a traffic device, after the user's identity is successfully confirmed, the drive module 270 may drive the mechanical structure 280 (e.g., a lock togue) connected to the traffic device to unlock. Alternatively, the drive module 270 may drive the mechanical structure 280 (e.g., an engine) to start. More specifically, the mechanical structure 280 may include mechanical components constituting a physical structure of the smart lock, such as a lock shell, a lock cylinder, a square shaft of the lock body, a lock tongue, a handle, or the like. The mechanical structure 280 may also include any mechanical transmission parts, such as a spring, a gear system, or the like. In some embodiments, the square shaft of the lock body may be driven and connected with the lock tongue, and the drive module 270 may drive the square shaft of the lock body to rotate through the mechanical transmission part, to drive the ejection or retraction of the lock tongue, and finally complete the locking or the unlocking. For example, the port of the drive module 270, such as the motor output shaft, may drive the square shaft of the lock body to rotate through a gear system, to realize the automatic unlocking or the automatic locking. In some embodiments, the handle may be connected to the square shaft of the lock body, and the manual locking or the manual unlocking of the smart door lock may be realized. In some embodiments, the drive module 270 may also drive the square shaft of the lock body back to a certain angle through the gear system to reserve a space for manually rotating the square shaft of the lock body through the handle or knob, to facilitate the manual unlocking or the manual locking. In some embodiments, one or more sensing components in the sensing module 210 may also be appropriately configured in the gear system to obtain the state information of the square shaft of the lock body.

It should be noted that the above description of the system for controlling the smart lock 200 and the modules is only convenient for description and may not limit the present disclosure to the scope of the embodiments. It may be understood that after understanding the principle of the system, those skilled in the art may arbitrarily combine each module or form a subsystem to connect with other modules without departing from this principle. For example, the sensing module 210, the processing module 220, the storage module 230, the communication module 240, the power supply module 250 and the input/output module 260 disclosed in FIG. 2 may be different modules in one system, or one module may realize the functions of the above two or more modules. For example, the processing module 220 and the communication module 240 may be two modules or one module with both processing and communication functions. As another example, each module may share one storage module, and each module may also have its own storage module. Such deformations are within the protection scope of the present disclosure. The mechanical structure 280 may not be limited to the lock of the door lock device, the roller shaft or the door body of the gate device, the lock or the engine of the traffic device, but may also be other structures. The specific structure may be subject to the type of the smart lock 130 and may not be further limited here. Any mechanical mechanism that may use the identification method contained in this present disclosure may be within the protection scope of this application.

Figure 3:
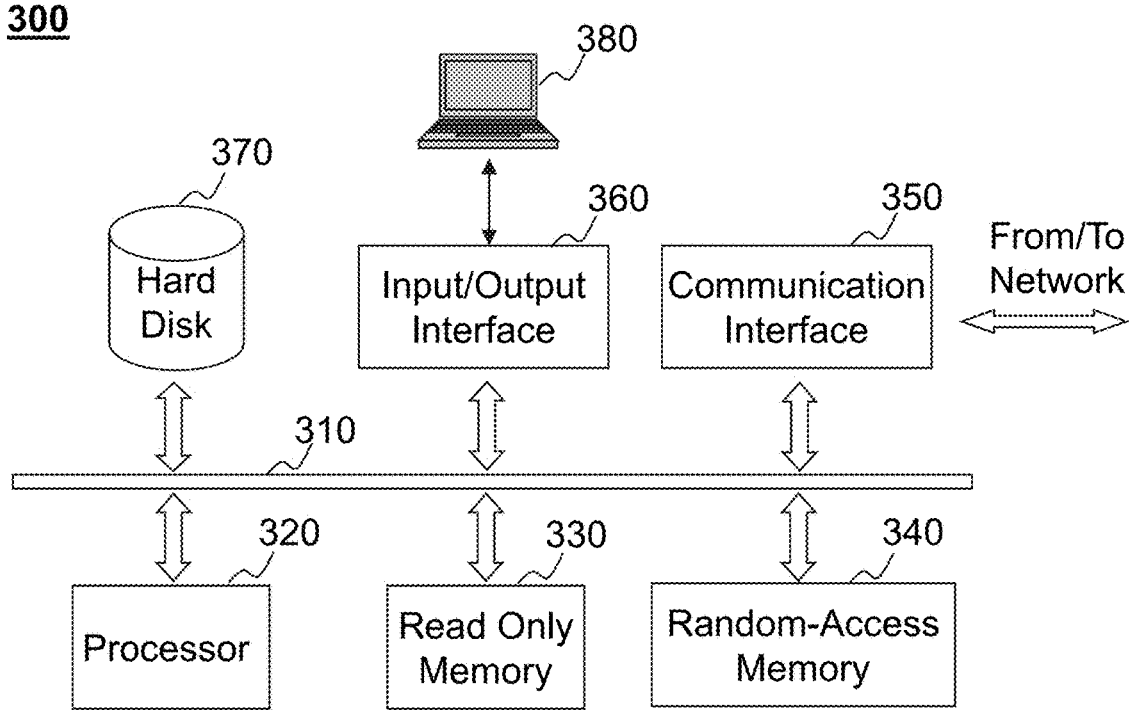
FIG. 3 is a schematic diagram illustrating an exemplary hardware and/or software of a computing device according to some embodiments of the present disclosure.

FIG. 3 is a schematic diagram illustrating an exemplary hardware and/or software of a computing device according to some embodiments of the present disclosure.

In some embodiments, the server 110 and/or the terminal device 140 may be implemented on a computing device 300. For example, the processing device may implement and perform the functions of the processing device disclosed in the present disclosure on the computing device 300. As shown in FIG. 3, the computing device 300 may include an internal communication bus 310, a processor 320, a read only memory 330, a random-access memory 340, a communication interface 350, an input/output interface 360, a hard disk 370, and a user interface 380.

The internal communication bus 310 may realize data communication between components in the computing device 300. For example, the processor 320 may send the data to other hardware such as a memory or the input/output port 360 via the internal communication bus 310. In some embodiments, the internal communication bus 310 may be an industry standard (ISA) bus, an extended industry standard (EISA) bus, a video electronic standard (VESA) bus, an external component interconnection standard (PCI) bus, or the like. In some embodiments, the internal communication bus 310 may be configured to connect various modules in the system for controlling the smart lock 200 shown in FIG. 2 (e.g., the sensing module 210, the processing module 220, the storage module 230, the communication module 240, the input/output module 260, the drive module 270).

The processor 320 may execute calculation instructions (program codes) and perform the functions of the method for controlling the smart lock described in the present disclosure. The calculation instructions may include programs, objects, components, data structures, processes, modules, and functions (the functions refer to the specific functions described in the present disclosure). For example, the processor 320 may process the information obtained from the smart lock 130. In some embodiments, the processor 320 may include a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced reduced instruction set computer (ARM), a programmable logic devices, or any circuit and processor capable of performing one or more functions, or any combination thereof. For illustration only, the computing device 300 in FIG. 3 may describe only one processor, but it should be noted that the computing device 300 in the present disclosure may also include a plurality of processors.

The memory of the computing device 300 (e.g., the read only memory (ROM) 330, the random-access memory (RAM) 340, the hard disk 370, or the like) may store the data/information obtained from any other component of the scenario of the system for controlling the smart lock 100. In some embodiments, the memory of the computing device 300 may be located in the smart lock 130 or in the server 110. An exemplary ROM may include a mask ROM (MROM), a programmable ROM (PROM), an erasable programmable ROM (PEROM), an electrically erasable programmable ROM (EEPROM), an optical disc ROM (CD-ROM), a digital universal disc ROM, or the like. An exemplary RAM may include a dynamic RAM (DRAM), a double rate synchronous dynamic RAM (DDR SDRAM), a static RAM (SRAM), a thyristor RAM (T-RAM), a zero capacitance (Z-RAM), or the like.

The input/output interface 360 may be configured to input or output the signals, the data, or the information. In some embodiments, the input/output interface 360 may enable the user to interact with the scenario of the system for controlling the smart lock 100. For example, the input/output interface 360 may include the communication module 240 to realize the communication and the alarm functions of the scenario of the system for controlling the smart lock 100. In some embodiments, the input/output interface 360 may include an input device and an output device. The exemplary input device may include a keyboard, a mouse, a touch screen, a microphone, or the like, or any combination thereof. The exemplary output device may include a display device, a speaker, a printer, a projector, or the like, or any combination thereof. The exemplary display device may include a liquid crystal display (LCD), a display based a light emitting diode (LED), a flat panel display, a curved surface display, a television device, a cathode ray tube (CRT), or the like, or any combination thereof. The communication interface 350 may be connected to the network for the data communication. The connection may be a wired connection, a wireless connection, or a combination of both. The wired connection may include a cable, an optical cable, a telephone line, or the like, or any combination thereof. The wireless connection may include a Bluetooth, a Wi-Fi, a WiMax, a WLAN, a ZigBee, a mobile network (e.g., the 3G, the 4G, the 5g, or the like), or any combination thereof. In some embodiments, the communication interface 350 may be a standardized port, such as RS232, RS485, or the like. In some embodiments, the communication interface 350 may be a specially designed port.

The hard disk 370 may be configured to store the information and the data generated by or received from the server 110. For example, the hard disk 370 may store user confirmation information of the user. In some embodiments, the hard disk 370 may include a HDD, a SSD, an HHD, or the like. In some embodiments, the hard disk 370 may be provided in the server 110 or in the smart lock 130. The user interface 380 may realize the interaction and the information exchange between the computing device 300 and the user. In some embodiments, the user interface 380 may be configured to present the information and the data generated by the scenario of the system for controlling the smart lock 100 to the user. For example, the user interface 380 may present the user confirmation results (e.g., identity confirmation success, identity confirmation failure) of the scenario of the system for controlling the smart lock 100 to the user. In some embodiments, the user interface 380 may include a physical display, such as a display with speakers, an LCD display, an LED display, an OLED display, an electronic ink display (E-Ink), or the like.

Figure 4:
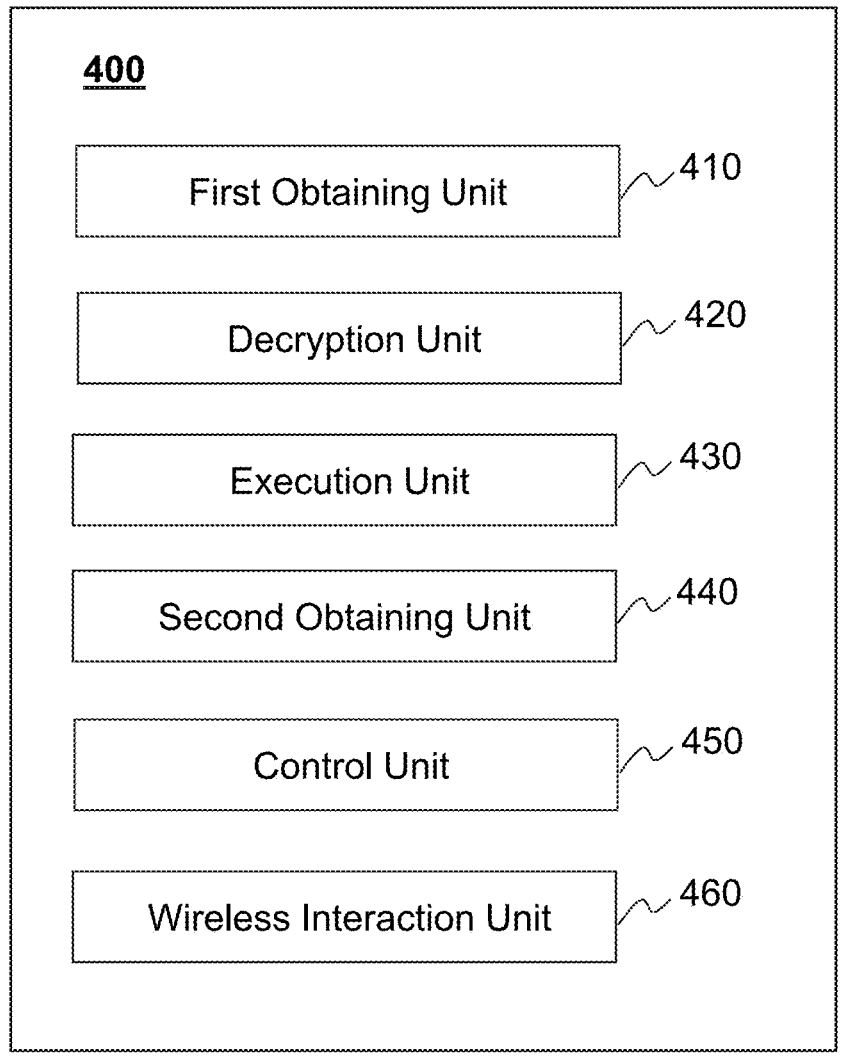
FIG. 4 is a block diagram illustrating an exemplary device for controlling the smart lock according to some embodiments of the present disclosure.

FIG. 4 is a block diagram illustrating an exemplary device for controlling the smart lock according to some embodiments of the present disclosure.

As shown in FIG. 4, the device for controlling the smart lock according to some embodiments of the present disclosure may be applied to the smart lock. In some embodiments, the device for controlling the smart lock 400 may include a first obtaining unit 410, a decryption unit 420, an execution unit 430, a second obtaining unit 440, a control unit 450, and a wireless interaction unit 460. In some embodiments, the first obtaining unit 410, the obtaining acquisition unit 440, and the wireless interaction unit 460 may be part of the communication module 240 shown in FIG. 2. The decryption unit 420, the execution unit 430, and the control unit 450 may be part of the processing module 220.

The first obtaining unit 410 may be configured to obtain the control request for the smart lock, wherein the control request carries the ciphertext information. In some embodiments, the ciphertext information is obtained by performing at least one of the following encryption operations on at least part of the control request: a symmetric encryption algorithm and an asymmetric encryption algorithm.

The decryption unit 420 may be configured to decrypt the ciphertext information in response to the control request to obtain a decrypted control request, that is, the plaintext information of the control request. In some embodiments, the decryption unit 420 may decrypt the ciphertext information according to a decryption key corresponding to an encryption key of the ciphertext information to obtain the plaintext information of the control request. In some embodiments, the smart lock may include an encryption chip for storing the decryption key. In some embodiments, the plaintext information may include at least a control instruction and a timestamp, wherein the timestamp is configured to indicate an effective time of the control instruction.

The execution unit 430 may be configured to control the smart lock to perform the target operation according to the plaintext information. In some embodiments, the execution unit 430 may obtain a current time and determine whether the current time matches the timestamp, and if so, the execution unit 430 may control the smart lock to perform the target operation. In some embodiments, the smart lock may include a clock chip. The execution unit 430 may send a current time obtaining request to the clock chip and obtain the time returned by the clock chip as the current time. In some embodiments, the time returned by the clock chip may be the time corrected by a network time protocol.

The second obtaining unit 440 may obtain the state information of the smart lock and/or the door body (or other devices) on which the smart lock is installed. The state information may reflect the current state of the smart lock and/or the door body (or other devices) on which the smart lock is installed before and/or after the target operation. In some embodiments, the smart lock may include one or more sensors, and the second obtaining unit 440 may obtain the data collected by the sensor. For example, the second obtaining unit 440 may obtain the third collected data of the third sensor and determine a retraction angle of the driving part based on the third collected data, wherein the third sensor may be configured to detect the retraction angle of the driving part of the smart lock, and the driving part may be configured to drive a movement of the square shaft of the smart lock body.

The control unit 450 may be configured to control the smart lock. For example, the control unit 450 may control the driving part to stop rotating when the retraction angle of the driving part meets a preset angle threshold and control the driving part to continue to rotate the preset angle threshold when the retraction angle of the driving part does not meet the preset angle threshold. As another example, the control unit 450 may control a fourth sensor to be in a sleep state when the timing duration of the timer of the smart lock exceeds the preset duration. The fourth sensor may be configured to detect the position information of the door body. In some embodiments, the control unit 450 may generate an associated device linkage instruction and/or the alarm information when the state information does not meet the control instruction. The associated device linkage instruction may be configured to control the opening of an imaging device associated with the smart lock.

The wireless interaction unit 460 may be configured for a wireless signal interaction with the terminal device. In some embodiments, the wireless interaction unit 460 may receive a wireless signal from a target terminal device, wherein the target terminal device may be a terminal device that establishes a wireless connection with the smart lock. In some embodiments, the wireless interaction unit 460 may determine whether the preset conditions are met according to the wireless signal of the target terminal device and instruct the target terminal device to send the control request for the smart lock when the preset conditions are met.

It should be noted that the above description of the device for controlling the smart lock 400 and the units/modules is only convenient for description and may not limit the present disclosure to the scope of the embodiments. It may be understood that after understanding the principle of the device, those skilled in the art may arbitrarily combine each unit module or form a sub device to connect with other modules without departing from this principle.

Figure 5:
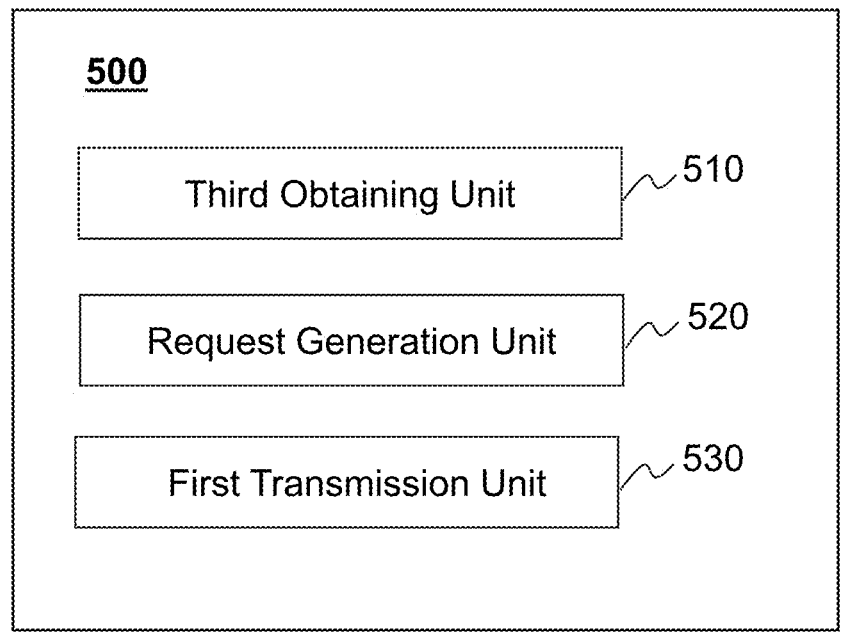
FIG. 5 is a block diagram illustrating another exemplary device for controlling the smart lock according to some embodiments of the present disclosure.

FIG. 5 is the block diagram illustrating another exemplary device for controlling the smart lock according to some embodiments of the present disclosure.

As shown in FIG. 5, the device for controlling the smart lock according to some embodiments of the present disclosure may be applied to the server. In some embodiments, the device for controlling the smart lock 500 may include a third obtaining unit 510, a request generation unit 520, and a first transmission unit 530.

The third acquisition unit 510 may be configured to obtain a remote control instruction and an smart lock identification corresponding to the remote control instruction, wherein the remote control instruction may be generated by the terminal device in response to a remote target operation input by the user.

The request generation unit 520 may be configured to generate the control request for the smart lock carrying the ciphertext information.

The first transmission unit 530 may be configured to send the control request for the smart lock corresponding to the smart lock identification.

It should be noted that the above description of the device for controlling the smart lock 500 and the units/modules is only convenient for description and may not limit the present disclosure to the scope of the embodiments. It may be understood that after understanding the principle of the device, those skilled in the art may arbitrarily combine each unit module or form a sub device to connect with other modules without departing from this principle.

Figure 6:
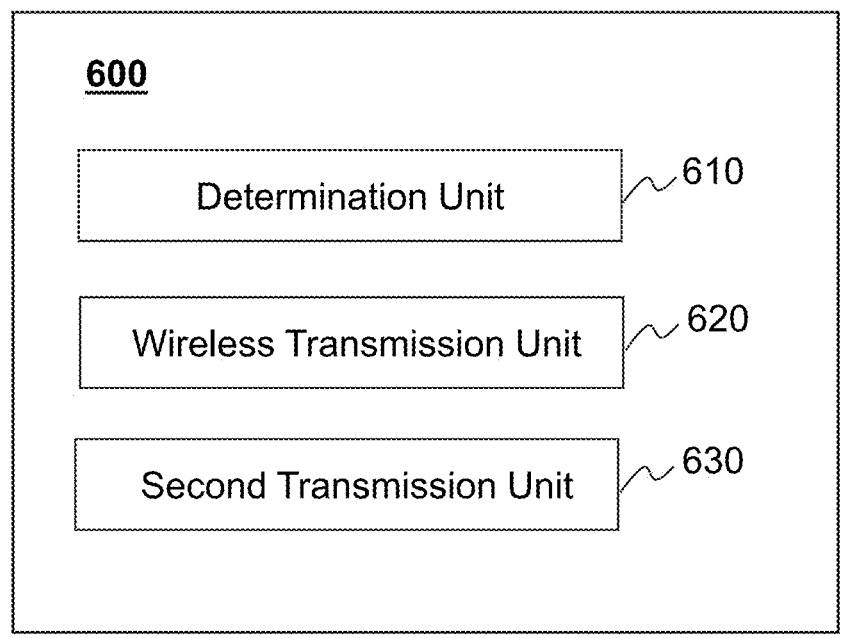
FIG. 6 is a block diagram illustrating another exemplary device for controlling the smart lock according to some embodiments of the present disclosure.

FIG. 6 is the block diagram illustrating another exemplary device for controlling the smart lock according to some embodiments of the present disclosure.

As shown in FIG. 6, the embodiments of the present disclosure may provide the device for controlling the smart lock applied to the terminal device. In some embodiments, the device for controlling the smart lock 600 may include a determination unit 610, a wireless transmission unit 620, and a second transmission unit 630.

The determination unit 610 may be configured to determine whether the terminal device meets the preset wireless signal transmission conditions. The wireless transmission unit 620 may be configured to send the wireless signal to the smart lock when the preset wireless signal transmission conditions are met, so that when the smart lock determines that the preset conditions are met according to the wireless signal, the wireless transmission unit 620 may instruct the terminal device to send the control request for the smart lock. The second transmission unit 630 may be configured to send the control request for the smart lock to the smart lock so that the smart lock may control the smart lock to perform the target operation according to the control request for the smart lock.

It should be noted that the above description of the device for controlling the smart lock 600 and the units/modules is only convenient for description and may not limit the present disclosure to the scope of the embodiments. It may be understood that after understanding the principle of the device, those skilled in the art may arbitrarily combine each unit module or form a sub device to connect with other modules without departing from this principle.

Figure 7:
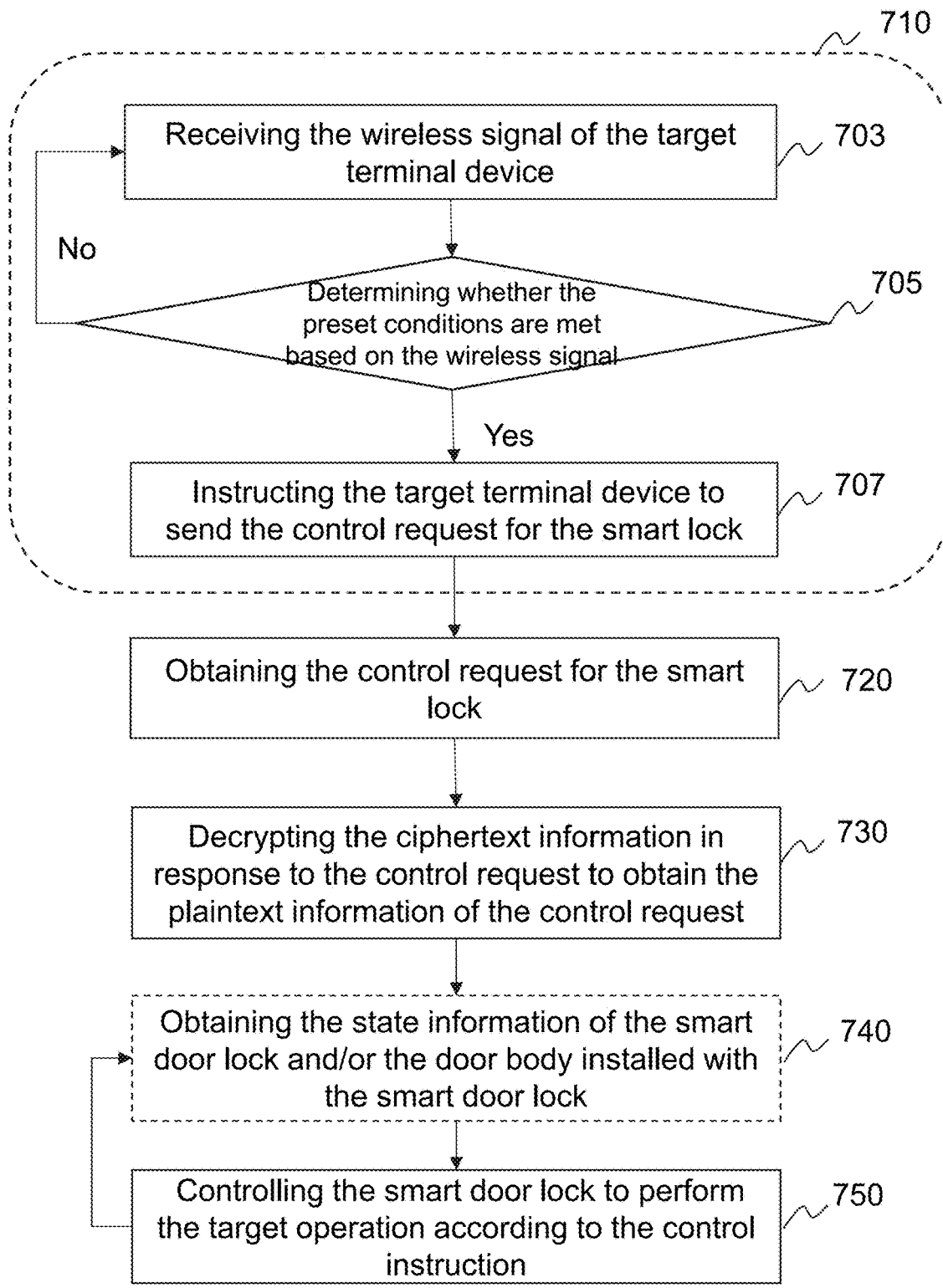
FIG. 7 is a flowchart illustrating an exemplary process for controlling the smart lock according to some embodiments of the present disclosure.

FIG. 7 is a flowchart illustrating an exemplary process for controlling the smart lock according to some embodiments of the present disclosure.

As shown in FIG. 7, the process 700 may include step 710, step 720, step 730, step 740, and step 750. In some embodiments, step 710 and step 740 in the dotted box may be omitted, that is, the executing body of the method for controlling the smart lock (e.g., the smart lock 130 shown in FIG. 1) may directly obtain the control request for the smart lock and control the smart lock to perform the target operation based on the plaintext information of the decrypted control request.

In step 710, the target terminal device may be instructed to send the control request for the smart lock. In some embodiments, step 710 may be performed by the wireless interaction unit 460.

The target terminal device may refer to the terminal device that establishes a wireless connection with the smart door lock. In some embodiments, the target terminal device may be any one of the terminal devices 140 or other types of terminal devices other than the terminal device 140, which is not limited in this present disclosure. In some embodiments, the wireless connection may include, but is not limited to, one or more of Bluetooth connection, Wi-Fi connection, infrared connection, wireless RF connection, or the like. In some embodiments, the target terminal device may be instructed to send the control request for the smart lock based on the wireless signal transmitted by the target terminal device.

Specifically, in step 703, the wireless signal of the target terminal device may be received. In some embodiments, the target terminal device may send the wireless signal to the smart door lock when the target terminal device determines the current location meets the preset geographic location conditions and/or the preset Wi-Fi signal identification is included in the Wi-Fi signal list recognized by the target terminal device. In some embodiments, the wireless signal may include a Bluetooth signal.

In step 705, whether the preset conditions are met based on the wireless signal may be determined. The preset conditions may reflect whether the execution conditions for controlling the unlocking or locking of the smart door lock are met between the smart door lock and the target terminal device. For example, the preset conditions may be whether the target terminal device is in a first motion state, and/or whether the target terminal device is within the preset range, or the like. The first motion state may be that the terminal device is moving close to the smart door lock. In some embodiments, a distance between the target terminal device and the smart door lock may be determined based on the wireless signal of the target terminal device, and whether the preset conditions are met may be determined according to the distance. In some embodiments, whether the preset conditions are met based on the signal strength of the wireless signal of the target terminal device may be determined.

In step 707, the target terminal device may be instructed to send the control request for the smart lock when the preset conditions are met. In some embodiments, when the preset conditions are not met, step 703 may be performed, that is, the wireless signal of the target terminal device may be received again. For more information on instructing the target terminal device to send the control request for the smart lock, please refer to other parts of this manual (for example, FIG. 15, FIGS. 18-19, and their related descriptions), which will not be repeated here.

In step 720, the control request for the smart lock may be obtained. In some embodiments, step 720 may be performed by the first obtaining unit 410.

In some embodiments, the control request for the smart lock obtained by the executing body of the method for controlling the smart lock (e.g., the smart lock 130 shown in FIG. 1) may be generated by the server (e.g., the server 110 shown in FIG. 1) based on the remote target operation by the user.

In some embodiments, the above executing agent may obtain the control request for the smart lock from the Internet of things gateway. For example, the user may input the remote target operation by clicking the option (e.g., an unlocking option, or a locking option) in the specified application interface displayed on the mobile terminal. After recognizing the remote target operation by the user, the terminal device may generate a remote control instruction and send the remote control instruction to the server. After receiving the remote control instruction, the server may determine the identification of the target smart door lock instructed to be opened by the remote control instruction, and generate the corresponding control request for the smart lock. After that, the server may send the remote control request of the smart door lock and the identification of the target smart door lock to the Internet of things gateway through the network (e.g., the network 120 shown in FIG. 1).

The Internet of things gateway may send the remote control request of the smart door lock to the smart door lock corresponding to the target smart door lock identification (i.e. the executing agent), so that the executing agent may obtain the remote control request.

In some alternative embodiments, the control request for the smart lock may be sent by the server, or the terminal device, or other possible devices or modules, which is not limited in the present disclosure. In some embodiments, the control request for the smart lock may include, but is not limited to, one or more combinations of the unlocking/locking control instructions, the smart door lock identification, the smart door lock/door body state information acquisition, instruction effective time (such as the timestamp), the control password, or the like. In some embodiments, the control request for the smart lock may carry the ciphertext information. The ciphertext information may be unreadable information that may only be displayed after inputting the corresponding key after processing the original plaintext information or data through some algorithms. In some embodiments, the encryption algorithm for obtaining the ciphertext information may include, but is not limited to, one or more combinations of the symmetric encryption algorithm, the asymmetric encryption algorithm, or the like.

In step 730, the ciphertext information may be decrypted in response to the control request to obtain the plaintext information of the control request. In some embodiments, step 730 may be performed by the decryption module 420.

In some embodiments, the above execution subject may decrypt the ciphertext information according to the decryption key corresponding to the encryption key of the ciphertext information to obtain the plaintext information of the control request. In some embodiments, the smart door lock may include the encryption chip for storing the decryption key. In some alternative embodiments, the smart door lock may obtain a Bluetooth key issued by the server and decrypt the control request through the Bluetooth key.

In the present embodiment, the above execution subject may obtain the decryption key from the server (e.g., the server 110 shown in FIG. 1). For example, after receiving the remote control request of the smart door lock, the above executing body may decrypt the ciphertext information carried in the remote control request based on the decryption key. In some embodiments, the above execution subject may also decrypt the ciphertext information according to the agreed key in the process which is tied to the server during initialization. For more details, please refer to other embodiments of this specification (for example, FIG. 8 and the related description), which will not be repeated here.

In step 740, the state information of the smart door lock and/or the door body installed with the smart door lock may be obtained. In some embodiments, step 740 may be performed by the second obtaining unit 440.

The state information may reflect the state of the smart door lock and/or the door body installed with the smart door lock before and/or after the target operation corresponding to the control request for the smart lock may be performed. In some embodiments, the above executive body may obtain the state information of the smart door lock and/or the door body installed with the smart door lock through the sensing module (such as the sensing module 210 shown in FIG. 2). For example, the angle information of the square shaft of the lock body of the smart door lock may be obtained through the first sensor, and the current state of the smart door lock may be determined based on the angle information. For another example, the position information of the door body may be obtained through the fourth sensor, and the current state of the door body may be obtained based on the position information. In some embodiments, the state information may be transmitted to the user terminal device. For example, after performing the target operation, the current state of the smart door lock and the corresponding door body may be obtained, and the corresponding control request execution information may be generated and sent to the user terminal device. For another example, when the door body or smart door lock is detected in an abnormal state before performing the target operation, such as when the control request is a lock (e.g., the lock) instruction, the door body may be detected in an open state, and the alarm information may be generated and sent to the user terminal device. For more information about the state information, please refer to other parts of the present disclosure (for example, FIGS. 9-14 and the related description), which will not be repeated here.

In step 750, the smart door lock may be controlled to perform the target operation according to the control instruction. In some embodiments, step 750 may be performed by the execution unit 430.

In some embodiments, the plaintext information may include the control instructions. The control instructions may reflect the execution of the smart door lock and/or the door body on which the smart door lock is installed. In some embodiments, the smart door lock may be controlled to perform the target operation based on the verification result of the plaintext information. For example, the execution subject may verify the plaintext information according to the preset verification rules. The smart door lock may be controlled to perform the target operation according to the control instruction if the verification passes; the smart door lock may not be controlled to perform the target operation if the verification fails. In some embodiments, the execution unit 430 may provide the power to some components in the mechanical structure 280 through the drive module 270 shown in FIG. 2 to complete the target operation.

The method for controlling the smart lock disclosed in this embodiment, after obtaining the control request for the smart lock generated based on the user's remote target operation, the smart door lock may decrypt the ciphertext information (e.g., the ciphertext information) carried by the remote control request, and verify the plaintext information (e.g., the plaintext information) obtained by the decryption. The smart door lock may be controlled to perform the target operation to open or close the smart door lock if the verification passes. Through the above scheme, the user may realize the remote control of the smart door lock, which is conducive to improving the user's experience satisfaction. At the same time, the risk of hijacking and disclosure of the information carried by the remote control request may be reduced by making the smart door lock remote control request carry the ciphertext information, and the risk of illegal users using forged remote control request to control the unlocking of the smart door lock may be reduced, which is conducive to improving the reliability and the security of the method for controlling the smart lock.

It should be noted that the above description of process 700 is only for example and explanation, and does not limit the scope of application of the present disclosure. For those skilled in the art, various modifications and changes may be made to the process 700 under the guidance of the present disclosure. However, the amendments and the changes may still within the scope of the present disclosure.

Figure 8:
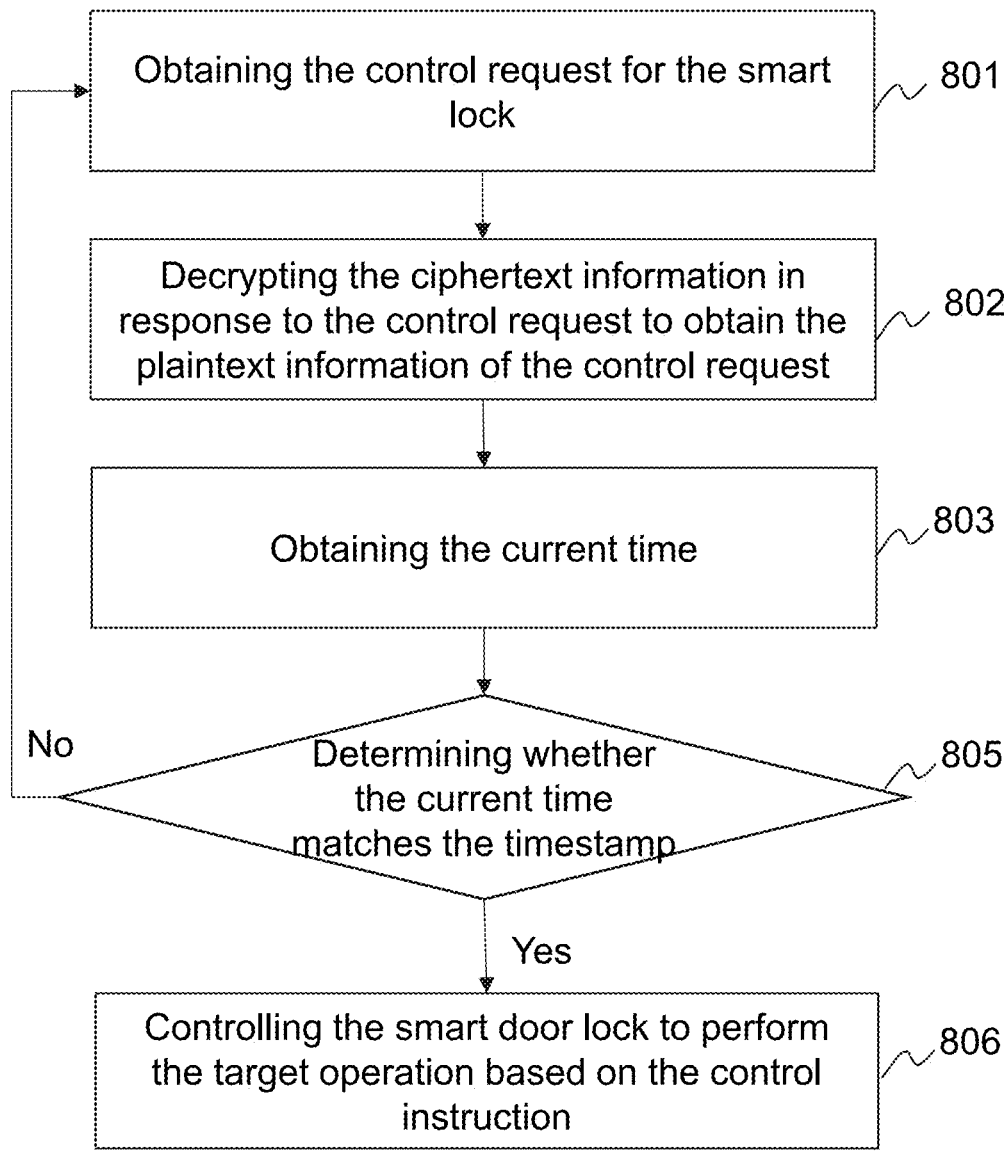
FIG. 8 is a flowchart illustrating another exemplary process for controlling the smart lock according to some embodiments of the present disclosure.

FIG. 8 is the flowchart illustrating another exemplary process for controlling the smart lock according to some embodiments of the present disclosure. The process 800 may include the following steps.

In step 801, the control request for the smart lock may be obtained. The control request for the smart lock may carry the ciphertext information. In some embodiments, step 801 may be performed by the first obtaining unit 410.

In some embodiment, the remote control request obtained by the executing body of the method for controlling the smart lock (e.g., the smart lock 130 shown in FIG. 1) may be generated by the server (e.g., the server 110 shown in FIG. 1) based on the remote control instruction sent by the user's terminal device (e.g., the terminal device 140 shown in FIG. 1). For example, the server may encrypt the plaintext information using the encryption key corresponding to the target smart door lock to generate the ciphertext information after determining the target smart door lock that is unlocked or locked as instructed by the remote control instruction. In step 801, the control request for the smart lock may be obtained, which is similar to the method of obtaining the control request for the smart lock in step 720 in the process 700. For more details, please refer to step 720, which will not be repeated here.

In some embodiments, the server may be tied to the smart door lock in advance to determine the encryption key corresponding to the smart door lock and the decryption key of the smart door lock. For example, the server may assign a pair of asymmetric keys composed of a public key and a private key to the smart door lock. The server may store the public key corresponding to the smart door lock as the encryption key to generate the ciphertext information in the remote control request by using the asymmetric algorithm. The smart door lock may store the private key distributed by the server as the decryption key to decrypt the ciphertext information in the remote control request. For another example, the encryption key may be sent to the smart door lock after the server generating the ciphertext information in the remote control request or before generating the control request, and the smart door lock may decrypt the ciphertext information in the remote control request by using the key through the symmetric algorithm.

In step 802, the ciphertext information may be decrypted in response to the control request to obtain the plaintext information of the control request. In some embodiments, step 802 may be performed by the decryption unit 420.

In some embodiments, a pre stored decryption key may be called to decrypt the ciphertext information. For example, the decryption key may be stored in advance in the above execution body (such as the smart lock 130 shown in FIG. 1), and the decryption key may be stored in the encryption chip of the smart door lock to ensure the security of the encryption key. Specifically, the decryption key stored in advance in the encryption chip may be called. In some alternative embodiments, the decryption key may be obtained from the external device such as the server, the terminal device, or the Internet of things gateway, and the ciphertext information may be decrypted based on the obtained decryption key to obtain the corresponding plaintext information. The present disclosure may not be limited to this.

In some embodiments, the plaintext information may include the timestamp. The timestamp may be configured to indicate the effective time of the control instruction and/or the plaintext information. In some embodiments, the timestamp in the plaintext information may include various forms. For example, the timestamp may be the deadline of the validity period of the plaintext information. For example, the timestamp may be: 2019-1-1-7:30, which means that the plaintext information is valid before 7:30 on Jan. 1, 2019. For another example, the timestamp may also be a starting time and an effective duration of the validity period of the plaintext information. For example, the timestamp may be: 2019-1-1-7:30 and 2 minutes, which means that the plaintext information is effective within two minutes from 7:30 on Jan. 1, 2019. For another example, the timestamp may contain only the start time of the validity period of the plaintext information, and the effective time length information of the timestamp may be stored in advance in the above execution body. In some embodiments, the timestamp may be any form used to determine the validity period of the plaintext information or the control instructions, which is not limited in the present disclosure.

In step 803, the current time may be obtained. In some embodiments, step 803 may be performed by the execution unit 430.

In some optional implementations of the present embodiment, the smart door lock may include the clock chip. Step 803 may specifically include: sending the current time acquisition request to the clock chip, and receive the time returned by the clock chip as the current time. In some embodiments, the time returned by the clock chip may be calibrated based on the reference clock information sent by the server. In some embodiments, the time returned by the clock chip may be the time corrected by the network time protocol. A Network Time Protocol (NTP) may be a protocol used to synchronize the computer time. The computer may be enable to synchronize the server or the clock sources (such as a quartz clock, a GPS, or the like). The NTP may provide a high-precision time correction (the difference between the LAN and a standard may be less than 1 millisecond, and tens of milliseconds on the WAN), and the malicious protocol attacks may be prevented by an encryption confirmation.

In this implementation, the user may calibrate the time of the clock chip of the smart door lock based on the specified application on the terminal device. Specifically, the user may use the specified application on the terminal device to send a time calibration request for the target smart door lock to the server. The server may send the reference clock information and the target smart door lock identification to the Internet of things gateway to send the reference clock information to the target smart door lock using the Internet of things gateway. Thus, the target smart door lock may calibrate the clock chip based on the reference clock information sent by the server, to improve the accuracy of the current time sent by the clock chip. In practical application, after the clock chip of the target smart door lock completes the calibration, the calibration results may be sent to the server and the user's terminal device after the clock chip of the target smart door lock completes the calibration.

In some embodiments, the smart door lock may include a power supply. The power supply of the smart door lock may be configured to supply the power to the clock chip, so that the clock chip may work continuously and ensure that the time is not lost. The problem that the enabling door lock depends on the network smoothness when obtaining the current time from the server may be solved and the operation stability of the method for controlling the smart lock may be improved by enabling the smart door lock to determine the current time based on the local clock chip.

In step 805, whether the current time matches the timestamp may be determined. In some embodiments, step 805 may be performed by the execution unit 430.

In the present embodiment, the current time may match the timestamp when the current time is within the validity period of the plaintext information determined based on the timestamp. The current time may not match the timestamp when the current time is not within the validity period of the plaintext information determined based on the timestamp.

In step 806, the smart door lock may be controlled to perform the target operation based on the control instruction if the current time matches the timestamp, and the execution may be ended or the control request for the smart lock may be obtained again if the current time does not match the timestamp. In some embodiments, step 806 may be performed by the execution unit 430.

In some embodiments, the smart door lock may be controlled to unlock to open the smart door lock when the remote control instruction obtained by the above executing body is an instruction for indicating the unlocking of the smart door lock after the verification is passed. The smart door lock may be controlled to lock the smart door lock when the remote control instruction obtained by the above executing body is the command for instructing the smart door lock to lock after the verification is passed.

In some optional implementations of the present embodiment, the plaintext information of the control request may also include a control password. Before executing step 805, whether the control password matches the preset control password may be determined. Step 805 may be executed if the control password matches the preset control password, and the execution process may be ended or the control request for the smart lock may be obtained again if the control password does not match the preset control password.

In this implementation mode, the smart door lock may be controlled to perform the target operation only after the verification is passed by verifying the control password and/or the timestamp in the remote control request, which may further improve the use security of the method for controlling the smart lock.

The method for controlling the smart lock applied to the smart door lock in the embodiments may decrypt the ciphertext information of the control request by calling the pre stored decryption key, obtaining the plaintext information containing the timestamp, and controlling the smart door lock to perform the target operation when the timestamp matches the current time. Thus, the scheme described in the embodiments may improve the security of the encryption key and the timeliness of the remote control request, so as to improve the use security of method for controlling the smart lock.

It should be noted that the above description of process 800 is only for example and explanation, and does not limit the scope of application of the present disclosure. For those skilled in the art, various modifications and changes may be made to the process 800 under the guidance of the present disclosure. However, the amendments and the changes may still within the scope of the present disclosure.

The smart door lock may communicate with external devices through the wireless transmission, so that users may control the smart door lock through the external devices to lock (may be understood as closing and locking) and unlock (may be understood as unlocking and opening). For example, in process 700, the user may send the control instruction through the external device such as the servers or the mobile terminal devices to control the smart door lock to lock or unlock. In some embodiments, the user may control the locking and/or unlocking of the smart door lock by sending the control instruction (or control request) through the smart door lock itself.

In some embodiments, the current state of the smart door lock and/or the door body installed with the smart door lock may be detected to determine whether the smart door lock and/or the door body installed with the smart door lock normally execute the operation of the control instruction in the control request when the smart door lock receives the control request and unlocks or locks the smart door lock in response to the control request. In some embodiments, the method for controlling the smart lock may be applied to a data processing device, which may refer to the external devices relative to the smart door lock, such as the servers, the mobile terminal devices, the Internet of things gateways, or the like, or the smart door lock itself, which is not limited in the present disclosure. It should be noted that the door locks proposed in the following embodiments of the present disclosure refer to the smart door locks described above.

In some embodiments, the door body may need to be in the closed position, and the lock body square shaft of the smart door lock itself may need to rotate to a certain angle to realize the door body locking when the control instruction is configured to control the smart door lock to perform the locking operation. Therefore, in this case, the position corresponding to the control instruction may refer to the position of the door body in the closed state, and the angle requirement corresponding to the control instruction may refer to the angle requirement that the square shaft of the lock body needs to rotate from unlocking to locking.

Similarly, the square shaft of the lock body itself may need to rotate reversely to the certain angle to realize the unlocking when the control instruction is configured to control the smart door lock to perform the unlocking operation. Therefore, in this case, the position corresponding to the control instruction may refer to the position where the door body is in the open state, and the angle requirement corresponding to the control instruction may refer to the angle requirement that the square shaft of the lock body needs to rotate from the locked state to the unlocked state of the door lock.

Figure 9:
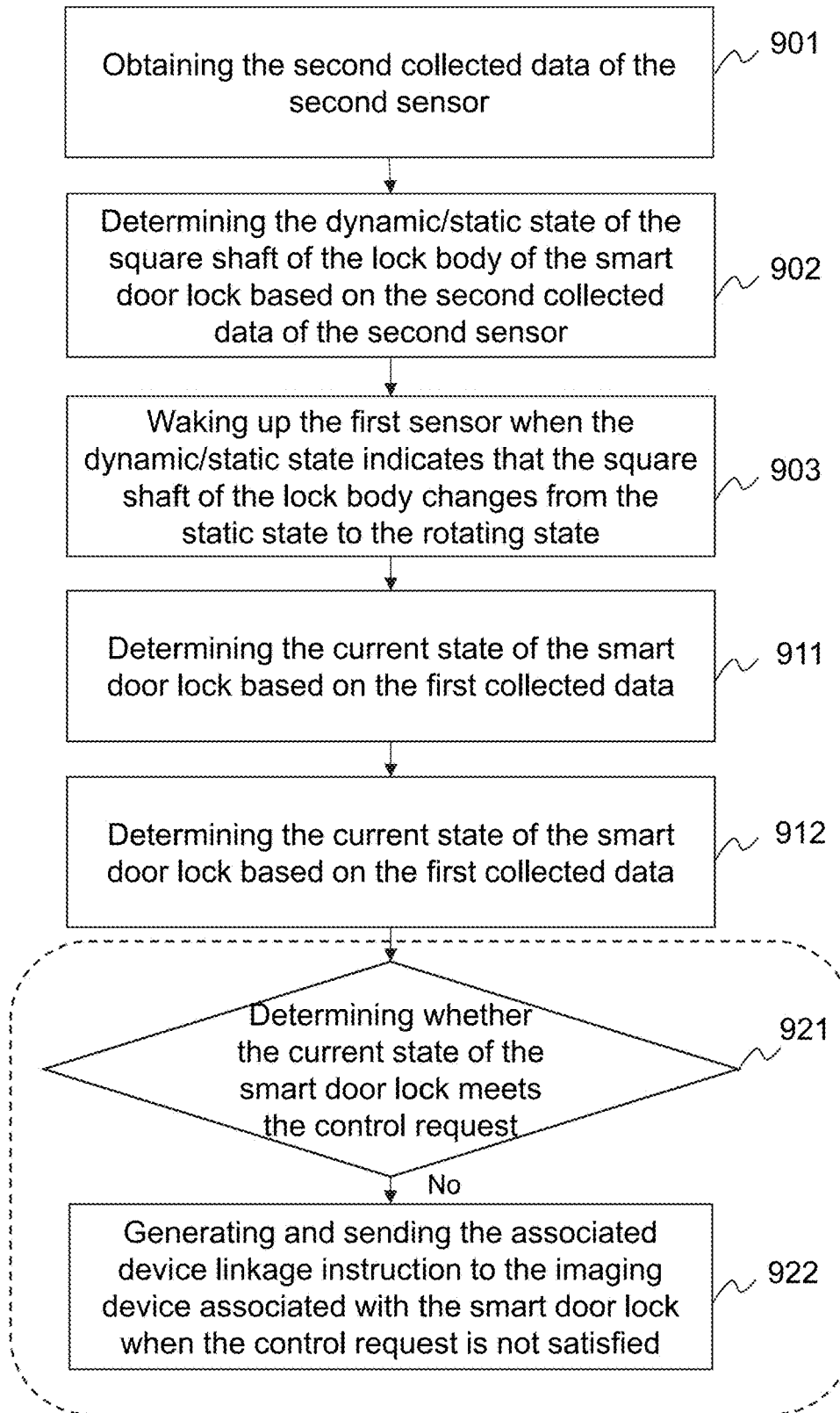
FIG. 9 is a flowchart illustrating another exemplary process for controlling the smart lock according to some embodiments of the present disclosure.
Figure 10:
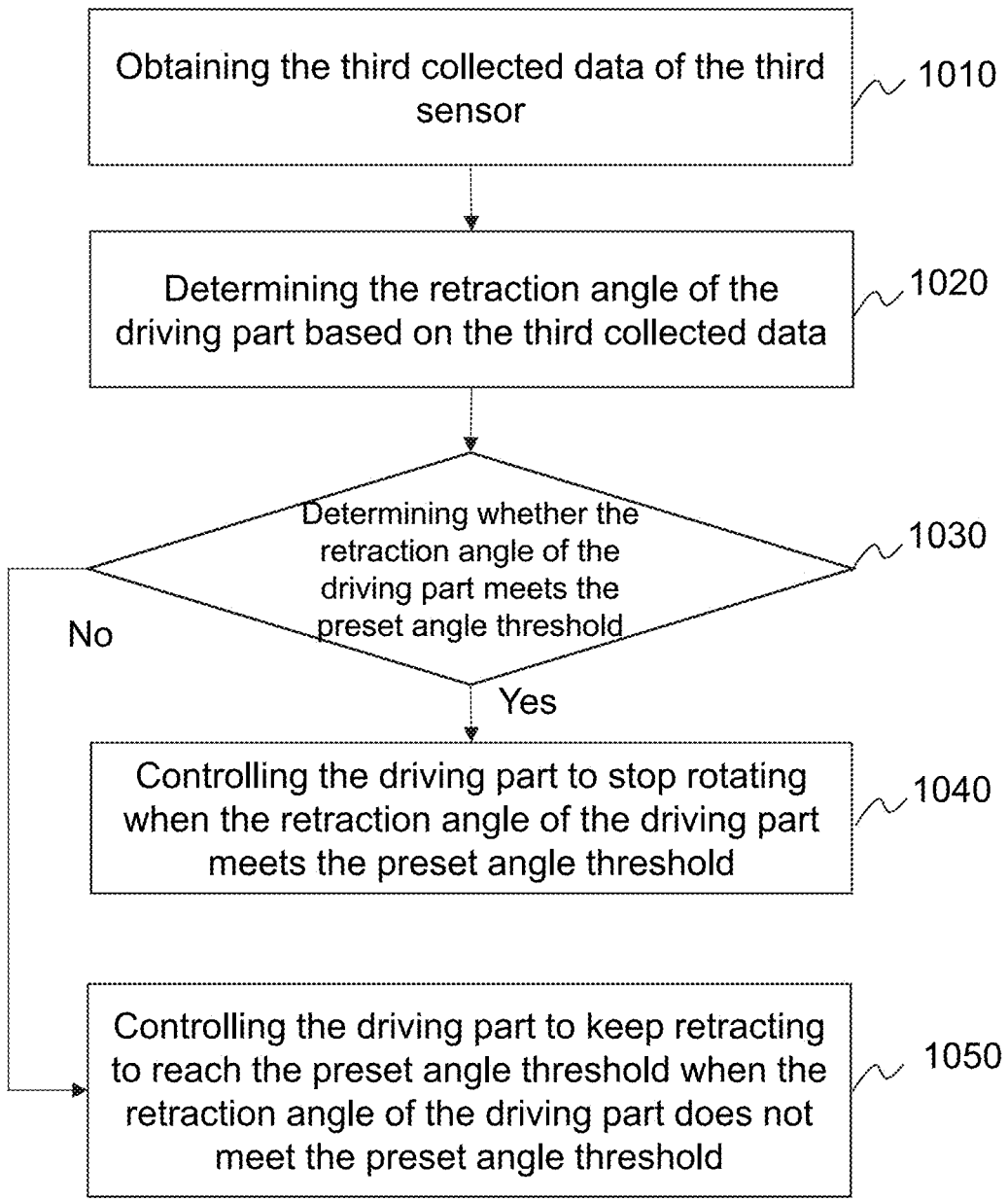
FIG. 10 is a flowchart illustrating another exemplary process for controlling the smart lock according to some embodiments of the present disclosure.
Figure 11:
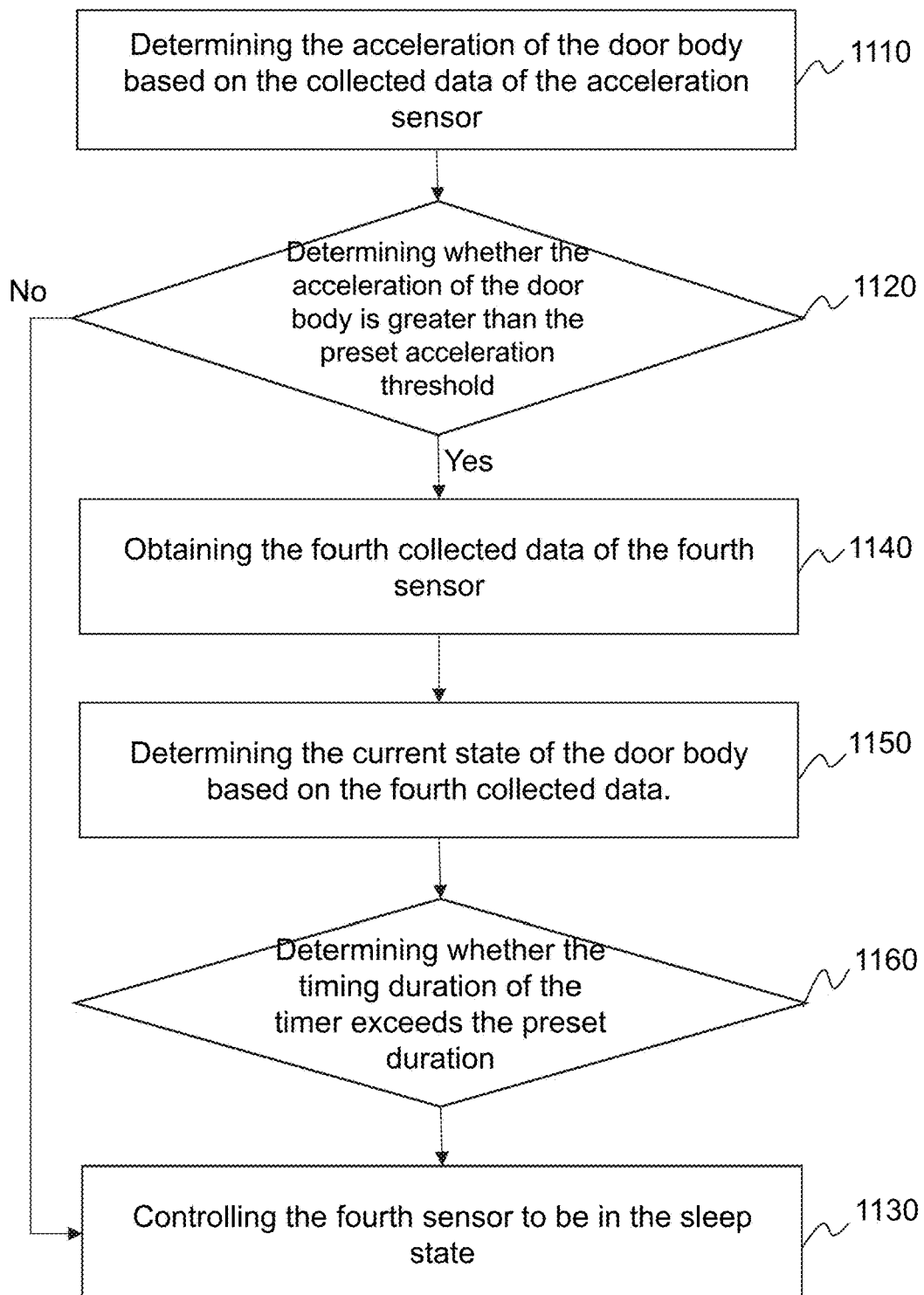
FIG. 11 is a flowchart illustrating another exemplary process for controlling the smart lock according to some embodiments of the present disclosure.

Based on the above settings, in FIGS. 9-11, the obtained angle information of the lock body square shaft of the smart door lock may be compared with the angle requirements corresponding to the control instruction, and the obtained current position information of the door body installed with the smart door lock may be compared with the position corresponding to the control instruction to obtain the state information of the smart door lock and/or the door body. In some embodiments, the state information of the smart door lock and/or the door body may be reported. For example, the state information may be pushed to the user terminal device, send to the Internet of things gateway, or transmit to the server, or the like.

In some embodiments, for the specific implementation method for obtaining the control request for the smart door lock and controlling the door lock to perform the target operation according to the control instruction in the control request, please refer to the above FIGS. 7-8 and the related descriptions, which will not be repeated in this embodiment.

FIG. 9 is the flowchart illustrating another exemplary process for controlling the smart lock according to some embodiments of the present disclosure.

As shown in FIG. 9, the executing body of the method for controlling the smart lock (e.g., the smart lock 130 shown in FIG. 1) may collect the motion state and/or the angle information of the smart door lock through the sensing module in the smart door lock, and obtain the current state of the smart door lock according to the motion state and/or the angle information, such as the state of one or more components in the mechanical structure of the smart door lock. In some embodiments, the above executing body may control the opening of the imaging device associated with the smart door lock to further understand the state of the smart door lock when the current state of the smart door lock does not meet the instruction corresponding to the control request. For example, the imaging device associated with the smart door lock may be controlled to turn on or the alarm device may send the alarm through the input/output module 260. In some embodiments, the process 900 may be performed by the second obtaining unit 440, including the following steps.

In step 911, the first collected data of the first sensor may be obtained.

In step 912, the current state of the smart door lock may be determined based on the first collected data.

In some embodiments, the smart door lock may include a first sensor, wherein the first sensor may be configured to detect the angle information of the square shaft of the lock body of the smart door lock. Among them, the square shaft of the lock body may be a transmission shaft of the door lock, which may drive the lock tongue to move during rotation to realize a contraction and an ejection of the lock tongue. The contraction of the lock tongue may indicate that the door lock is in the unlocked state, and the ejection of the lock tongue may indicate that the door lock is in the locked state. Therefore, in the process of detecting the current state of the door lock, it is necessary to detect the rotation angle information of the square shaft of the lock body. The rotation angle information may include, but is not limited to, the rotation angle of the lock body square shaft, the rotation displacement of the square shaft of the lock body, or the position information after the lock body square shaft rotates, or the like.

Specifically, the user performs the locking (e.g., the locking) operation, generally turning the knob of the door lock manually along the locking direction of the door lock until the door lock is locked. In the process of the door lock from opening to closing, the detected rotation angle of the square shaft of the lock body, or the path of the square shaft of the lock body, that is, the rotation distance of the square shaft of the lock body, or when the door lock is locked, the detected position information of the square shaft of the lock body. These may be configured as the angle value of the rotation of the square shaft of the lock body from unlocking (e.g., the unlocking) to locking, the displacement stroke of the rotation of the square shaft of the lock body, or the position information after the rotation of the square shaft of the lock body.

Similarly, during the operation of manually turning the knob of the door lock along the unlocking direction of the lock until the door lock is opened, the detected rotation angle value of the square shaft of the lock body, the rotation stroke of the square shaft of the lock body, and the position information of the square shaft of the lock body when the door lock is open may be configured as the rotation angle value of the square shaft of the lock body from locking to unlocking, the displacement stroke of the lock body square shaft rotation, or the position information after the lock body square shaft rotation.

In this implementation mode, the first sensor may be an angle sensor. After the smart door lock performs the target operation in response to the remote control request, the rotation angle of the square shaft of the door lock (e.g., the square shaft of the lock body) may be determined according to the first collected data of the first sensor, so as to obtain the current state of the smart door lock. For example, when the target operation is the unlocking operation, if the rotation angle of the square shaft of the door lock is greater than or equal to the first preset rotation angle, the smart door lock is in the unlocking state may be determined, otherwise, the smart door lock is in the locking state may be determined. Similarly, when the target operation is a locking (e.g., locking) operation, if the rotation angle of the square shaft of the door lock is greater than or equal to the second preset rotation angle, the smart door lock is in the locked state may be determined, otherwise, the smart door lock is in the unlocked state may be determined. The first preset rotation angle and the second preset rotation angle may be determined according to an actual situation of the smart door lock. The first preset rotation angle and the second preset rotation angle may be the same or different. In some embodiments, the judgment method of the current state of the door lock when the door lock performs the locking operation and unlocking operation may be the same or different, which is not limited in this present disclosure. For example, if the first preset rotation angle and the second preset rotation angle are the preset values obtained by the test method of reverse decrease accumulation and positive increase accumulation of the square shaft of the lock body respectively, the determination method corresponding to the locking operation may be determined that the smart door lock is locked when the rotation angle of the square shaft of the door lock is less than the second preset rotation angle, the determination method corresponding to the unlocking operation may be that if the rotation angle of the square shaft of the door lock is greater than or equal to the first preset rotation angle, the smart door lock is in the unlocked state may be determined.

In practical application, the rotation direction of the square shaft of the door lock may also be determined according to the first collected data of the first sensor, and the opening state and the closing state information (e.g., the current state) of the smart door lock may be determined based on the determined rotation direction of the square shaft of the door lock. For example, it may be preset that when the first collected data of the first sensor is a positive number, the square shaft of the door lock may rotate in the unlocking direction when the first collected data of the first sensor is a positive number, and the square shaft of the door lock may rotate in the locking direction when the first collected data of the first sensor is negative.

Correspondingly, when the target operation is the unlocking operation, the rotation direction of the square shaft of the door lock determined based on the first collected data of the first sensor is the unlocking direction, and the first collected data of the first sensor is greater than the first preset rotation angle, the smart door lock is in the unlocking state may be determined, otherwise, the smart door lock is in the locking state may be determined. Alternatively, when the target operation is a locking operation, the rotation direction of the square shaft of the door lock determined based on the first collected data of the first sensor is the locking direction, and the first collected data of the first sensor is greater than the second preset rotation angle, the smart door lock is in the locking state may be determined, otherwise, the smart door lock is in the unlocking state may be determined.

In this implementation mode, the accuracy of the rotation angle and the rotation direction of the square shaft of the door lock determined based on the collected data of the angle sensor is high, which may improve the accuracy of the opening state and the closing state information of the smart door lock.

In some embodiments, the smart door lock may include a second sensor, which may be configured to detect the dynamic state and the static state of the square shaft of the lock body of the smart door lock. Correspondingly, the process 900 may also include: in step 901, the second collected data of the second sensor may be obtained; in step 902, the dynamic/static state of the square shaft of the lock body of the smart door lock may be determined based on the second collected data of the second sensor; and in step 903, the first sensor may be woke up when the dynamic/static state indicates that the square shaft of the lock body changes from the static state to the rotating state.

In some embodiments, the second sensor may be a Hall sensor. In this implementation mode, the power dissipation of the smart door lock may be reduced and the standby time of the smart door lock may be improved by waking up the first sensor after recognizing the rotation of the square shaft of the lock body of the smart door lock. In some embodiments, the first sensor may be in a power-saving state such as a low-power state and the sleep state before being awakened, which is not limited in the present disclosure.

For ease of understanding, the obtaining of the current state of the smart door lock may be described in detail below in combination with FIG. 16A and FIG. 16B.

Figure 16A:
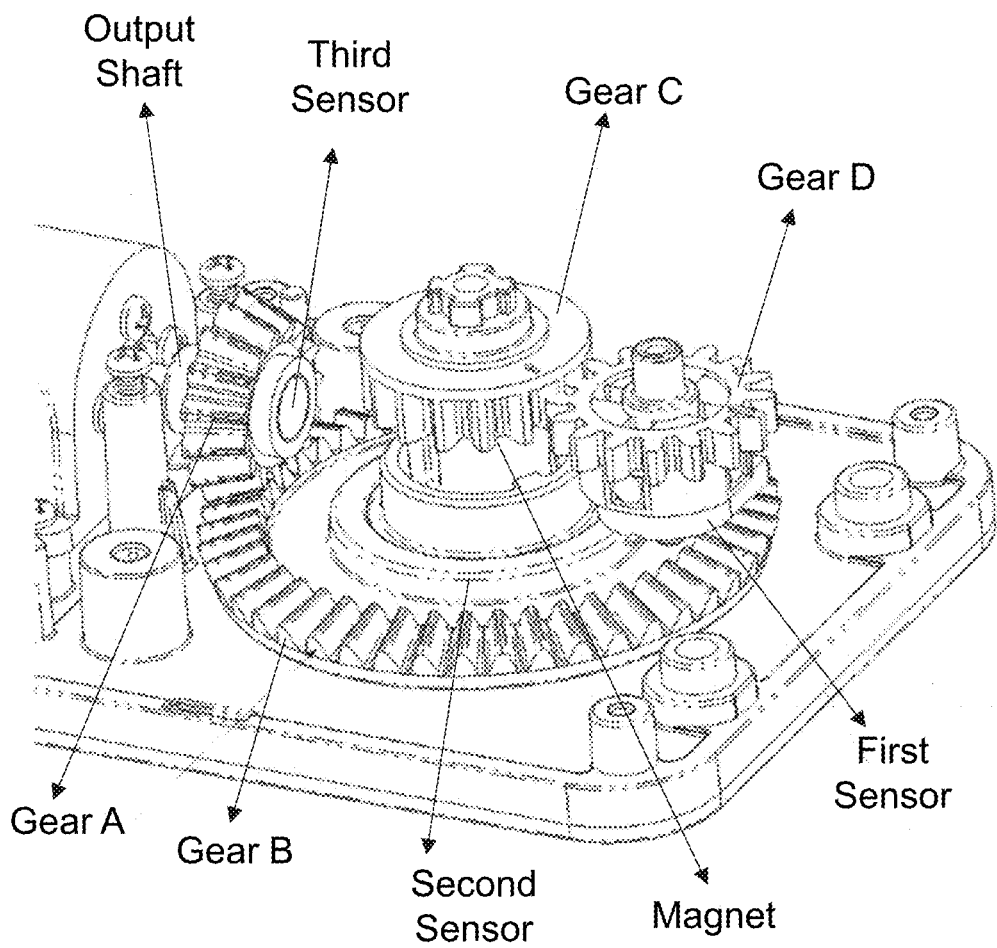
FIG. 16A is a structural diagram illustrating an exemplary smart lock according to some embodiments of the present disclosure.
Figure 16B:
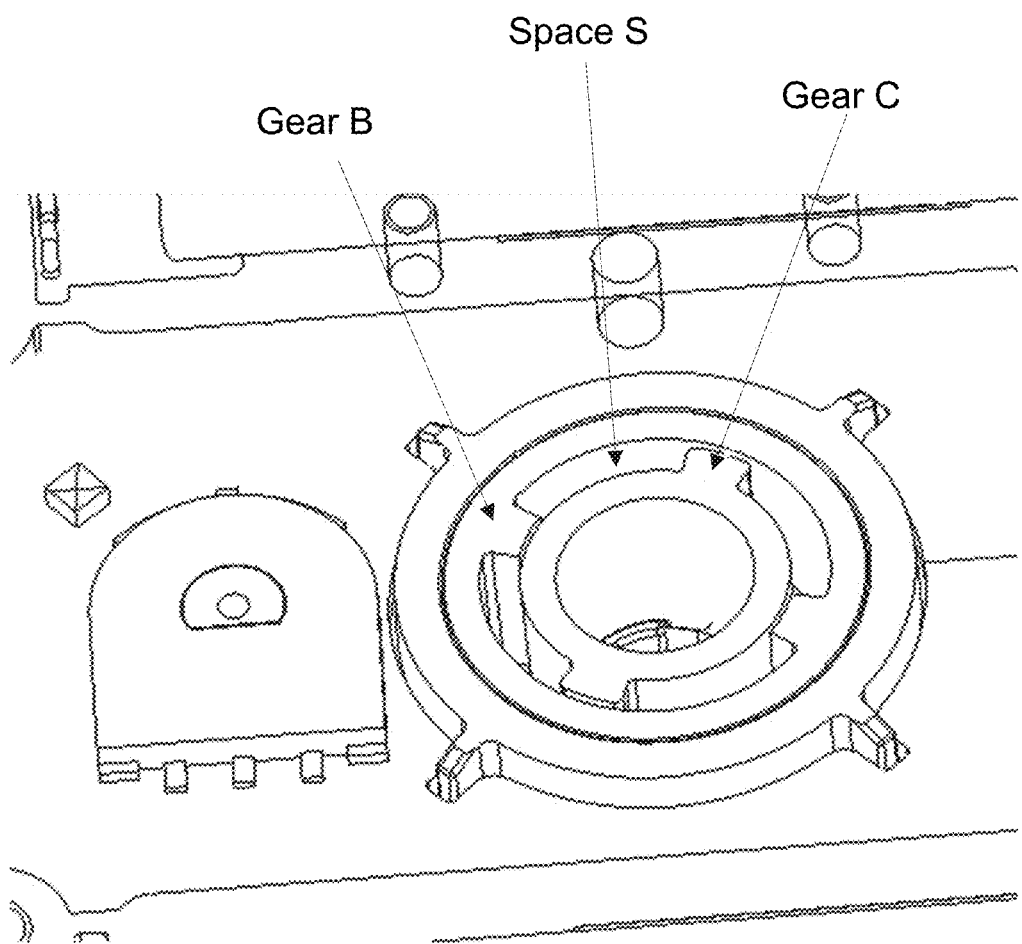
FIG. 16B is a structural diagram illustrating another exemplary smart lock according to some embodiments of the present disclosure.

FIG. 16A and FIG. 16B are the structural diagram illustrating the exemplary smart lock according to some embodiments of the present disclosure. As shown in FIG. 16A, the smart door lock may include a driving component. As a power provider, the driving component may be configured to drive one or more components in the mechanical structure 280 of the smart door lock, such as the square shaft of the lock body, the mechanical transmission structure, the latch, or the like. For example, the port of the output shaft of the driving component may be rigidly connected to a gear A, wherein the gear A is in transmission connection (e.g., a meshing) with another gear B. A rigid connection may be understood as two or more parts connected to each other may not move relative, such as riveting, welding, bonding, integral forming, or screw connection. A transmission connection may be understood as two or more parts connected with each other may be rigidly connected or movably connected, if they transmit motion, and the movable connection may be lever connection, meshing or thread fit. When the driving part is running, the driving part may output the shaft rotation to drive the gear A and the gear B at the same time. The gear B may relate to a gear C, and the gear C may relate to gear B in a virtual position, that is, the gear B and the gear C may add a virtual position in the structure to provide a space for manual rotation of the knob of the door lock. Only as an example, as shown in FIG. 16B, there may be a space between the gear B and the gear C (as shown in a space S in FIG. 16B). When the gear B and the gear C rotates the certain angle relative to the other party in the certain direction, the gear B and the gear C may contact and then drive the other party to rotate when the gear B and the gear C continues to rotate in a predetermined direction. The gear C may be rigidly connected with the square shaft of the lock body, and the gear C may also be meshed and connected with a gear D. The gear D may be driven to rotate during the rotation of the gear C. Because the gear C is rigidly connected with the square shaft of the lock body, the square shaft of the lock body may also be driven to rotate during the rotation of the gear C. The square shaft of the lock body may be the transmission shaft of the lock tongue, and the rotation of the square shaft of the lock body may drive the expansion and the contraction of the lock tongue.

In some embodiments, the first sensor may be arranged around the gear D to obtain the rotation information of the square shaft of the lock body. For example, the first sensor may be arranged to rotate coaxially with the gear D. The rotation angle information of the gear D may be continuously detected by the first sensor to obtain the detection data during the rotation of the gear D. Because the rotation of the gear D is driven by the gear C, the first sensor may obtain the rotation angle information of the gear D, which may be equivalent understood as obtaining the rotation angle information of the gear C, that is, equivalent obtaining the rotation angle information of the square shaft of the lock body.

It may be seen from the above contents that the first sensor may collect the rotation angle information of the detection part, which may refer to the gear D (also known as the first gear). In order to realize the rotation of the first gear, the transmission part adapted to the detection part may need to provide the power. Since the first gear is meshed with the gear C (also known as the second gear), and the gear C is rigidly connected with the square shaft of the lock body, therefore, in some embodiments, the transmission component may include the second gear rigidly connected with the square shaft of the lock body.

In some embodiments, the first preset value (e.g., the second preset rotation angle) may be obtained by testing before executing the method for controlling the smart lock disclosed in the present disclosure. For example, the door lock locking operation may be performed once. During the door closing and locking, the first sensor may detect the rotation angle information of the first gear in the process and obtain the detection result, that is, the first sensor accumulates once every time the first gear rotates. Finally, after the lock is locked, the accumulated value obtained by the first sensor may indicate that the door lock is in the locked state. Therefore, the first preset value may be obtained by using the above accumulated value.

Based on this, after the door lock performs the door body locking operation in response to the control instruction, the first sensor may collect the rotation information of the first gear to obtain the rotation angle information of the square axis of the lock body. For example, the first sensor may continuously collect the rotation angle information of the first gear to obtain the current detection value. The data processing device (for example, the processing module 220 shown in FIG. 2) may continuously obtain the detection value obtained by the first sensor and determine whether the current detection value obtained each time reaches the first preset value. If the current detection value once reaches the first preset value, the door lock is in the locked state may be determined; and if the current detection value of each time within the period does not reach the first preset value, the door lock is not completed the locking operation may be determined.

Similarly, the second preset value (e.g., the first preset rotation angle) may be obtained through the test. Specifically, in the unlocking process, the first gear may rotate reversely relative to the locked state, and the counting result of the first sensor may continue to decrease from the detection value corresponding to the closing of the door lock. Therefore, the detection value smaller than the corresponding detection value in the closed state of the door lock may be set as the second preset value.

Based on this, after the door lock performs the door body unlocking operation in response to the control instruction, the first sensor may collect the rotation information of the first gear to obtain the rotation angle information of the square axis of the lock body. For example, the first sensor may continuously detect the rotation angle information of the first gear to obtain the current detection value. Based on the method for obtaining the second preset value, the data processing device may continuously obtain the detection value obtained by the first sensor and determine whether the current detection value obtained each time is less than the second preset value. If the current detection value is less than the second preset value once, the door lock is in the unlocked state may be determined; and if the current detection value of each time within the period does not reach the second preset value, the door lock is not completed the locking operation may be determined.

As shown in FIG. 16A, in some embodiments, the second sensor may be set around the gear C to detect the dynamic/static state of the gear C to obtain the dynamic/static state of the square shaft of the lock body. For example, the second sensor may be fixedly arranged on the gear B coaxially connected with the gear C. When the gear C rotates, the movement of the gear C may be detected by the second sensor. Since the rotation of the gear C is synchronized with the square shaft of the lock body, the state information of the gear C from stationary to moving detected by the second sensor may be equivalent to the dynamic/static state of the square shaft of the lock body. As an example, the first sensor may be the angular displacement sensor, the second sensor may be the Hall sensor, the angular displacement sensor may be set coaxially with the gear D, the hall sensor may be set on the gear B close to the rotating shaft of the gear C, and the magnet A may be set on the gear C (such as on the plane with the wheel disc of the gear C facing downward).

In some embodiments, the above executing body may determine whether the control request according to the current state of the obtained smart door lock is met. Correspondingly, the process 900 may also include: in step 921, whether the current state of the smart door lock meets the control request may be determined; in step 922, the associated device linkage instruction may be generated and sent to the imaging device associated with the smart door lock when the control request is not satisfied.

In some embodiments, the smart door lock may be set in linkage with at least one imaging device, wherein the imaging device may be various types of cameras, cat eyes, or the like. When the current state of the smart door lock does not meet the control instruction of the control request is detected, the associated device linkage instruction may be generated to control the opening of the imaging device associated with the smart door lock. In some embodiments, the imaging device may be associated with the user terminal device so that the user may obtain the image data of the smart door lock through the imaging device. In some embodiments, the above execution subject may send the linkage instruction to the external device of the smart door lock (e.g., the server, the user terminal device, the Internet of things gateway, or the like). The user may obtain the linkage instruction to determine whether to turn on the corresponding imaging device. In some embodiments, when the current state of the smart door lock does not meet the control instruction in the control request is detected, the executing body may output the reminder information to remind the user that the door lock does not execute the control instruction normally, and the user may decide whether to generate the linkage instruction.

It should be noted that the above description of process 900 is only for example and explanation, and does not limit the scope of application of the present disclosure. For those skilled in the art, various modifications and changes may be made to the process 900 under the guidance of the present disclosure. However, the amendments and the changes may still within the scope of the present disclosure.

FIG. 10 is the flowchart illustrating another exemplary process for controlling the smart lock according to some embodiments of the present disclosure.

As shown in FIG. 10, the method for controlling the smart lock provided by the embodiment of the present disclosure may also detect the rotation angle of the driving part in the smart lock to determine whether the driving part returns to the corresponding position. In some embodiments, the process 1000 may be performed by the second obtaining unit 440 and the control unit 450.

In step 1010, the third collected data of the third sensor may be obtained.

In step 1020, the retraction angle of the driving part based on the third collected data may be determined.

In some embodiments, the smart door lock may also include the third sensor. The third sensor may be configured to determine the retraction angle of the output shaft of the driving component of the smart door lock. For example, as shown in FIG. 16A, the third sensor may be set on a Printed Circuit Board (PCB) corresponding to the output shaft of the driving part to obtain the retraction angle of the driving part. In some embodiments, the drive part may be a drive motor. The rotation of the drive motor may be controlled when the smart door lock performs the target operation, and when the output shaft of the drive motor rotates, the drive motor may need to return normally after the cooperation of multiple gears (for example, the gear A, the gear B, the gear C, and the gear D shown in FIG. 16A) are derived to unlock or lock the door lock when the output shaft of the drive motor rotates, and after the drive motor normally return, the drive motor may drive the next door lock unlocking or locking. When the driving part is in the normal return state, there may be a return angle (e.g., the preset angle threshold). Therefore, whether the driving part is in the normal return may be determined by comparing the current return angle of the driving part with the return angle corresponding to the normal return. As an example, the third sensor may be a magnetic encoder, which may be fixedly installed on the PCB corresponding to the output shaft of the driving component. For example, on the PCB directly below the output shaft, the magnet B may be installed at the center of the output shaft. When the driving component rotates, the output shaft may drive the magnet B to rotate, and the magnetic encoder may obtain the rotation angle of the magnet B and get the retraction angle of the drive assembly.

In some embodiments, the operation of the door lock unlocking and the door lock locking may be performed in advance to determine the detection value or the retraction angle of the third sensor corresponding to the normal return of the driving motor after the door lock is unlocked or locked, and take it as the standard value corresponding to the door lock unlocking and/or locking (e.g., the preset angle threshold).

Based on this, when the door lock is unlocked or locked in response to the control instruction, the detection data of the third sensor (e.g., the third collected data) may be obtained, and the obtained third collected data may be compared with the standard value corresponding to the control instruction, to determine whether the third collected data of the third sensor is equal to the standard value corresponding to the control instruction. In some embodiments, the third sensor may include, but is not limited to, a magnetic encoder, an infrared tube code disk, an angular displacement sensor, or the like.

In some embodiments, when the driving part does not retreat to the standard position, the driving part may be controlled to continue rotating to reach the preset position.

Specifically, in step 1030, whether the retraction angle of the driving part meets the preset angle threshold may be determined; in step 1040, the driving part may be controlled to stop rotating when the retraction angle of the driving part meets the preset angle threshold; In step 1050, the driving part may be controlled to keep retracting to reach the preset angle threshold when the retraction angle of the driving part does not meet the preset angle threshold. In some embodiments, the preset angle threshold may be an angle value determined based on the standard value. In some alternative embodiments, the preset angle threshold may be replaced with a preset position, a preset displacement value, or the like, to determine whether the driving part is retracted in place, which is not limited in the present disclosure. In some embodiments, when the driving part is not normally returned is determined, the reminder information may be output to remind the user that the driving part is not normally returned.

In practical application, the user may need to rotate the mechanical key to drive the drive motor in the smart door lock to unlock or lock the smart door lock when the drive motor output shaft of the smart door lock is not separated from the square shaft, and the user may need a lot of torque to rotate the mechanical key. Therefore, it is necessary to control the drive motor output shaft of the smart door lock to retreat after controlling the smart door lock to perform the target operation, to realize the separation of the drive motor output shaft and the square shaft, to facilitate the user to perform manual operation on the smart door lock. For example, as shown in FIG. 16B, when the driving part returns normally, there may be the certain virtual space S between the gear B and the gear C, when the gear C rotates driven by the square shaft of the lock body, the gear B may not be derived to rotate, that is, the square shaft of the lock body may be rotated without overcoming the resistance of the driving part. In this implementation mode, the retraction control of the motor output shaft may be realized based on the collected data of the third sensor, which is convenient for the user to manually control the smart door lock.

FIG. 11 is the flowchart illustrating another exemplary process for controlling the smart lock according to some embodiments of the present disclosure.

The movement of the door body and the position of the door body may be adjusted accordingly when the door lock performs the unlocking or locking operation in response to the control instruction. Therefore, detecting the current position of the door body may determine whether the door lock normally executes the control instruction. In some embodiments, the process 1100 may be performed by the second obtaining unit 440 and the control unit 450.

In step 1110, the acceleration of the door body may be determined based on the collected data of the acceleration sensor.

The acceleration may occur at the moment that the door is closed or opened. Therefore, whether the door body is being opened or closed may be determined by detecting the data of the door body through the acceleration sensor.

If only one sensor is configured to determine whether the door body is in the closed state, the sensor may be subject to various interferences, resulting in incorrect determination of the door body state by the smart door lock. For example, the door body is actually in the closed state, but the smart door lock detects that the door body is in the open state, or the door body is actually open, but the smart door lock detects that the door body is in the closed state. In some embodiments, the acceleration sensor and the fourth sensor may be set on the smart door lock or the door body. When the acceleration of the door body installed with the smart door lock is greater than the preset threshold through the acceleration sensor, and whether the door body is in the closed state may be determined based on the data collected by the fourth sensor, which may improve the accuracy of door body state recognition. Specifically in the following steps.

In step 1120, whether the acceleration of the door body is greater than the preset acceleration threshold may be determined.

In some embodiments, the acceleration sensor may be tested before the detection value of the collected door body is detected by the acceleration sensor to determine the state of the door body. For example, the detection value of the acceleration sensor at the moment when the door is in the closed and/or opened state may be tested as the preset acceleration threshold corresponding to the door closed state.

In some embodiments, when the detection value detected by the acceleration sensor is obtained, the detection value may be compared with the preset acceleration threshold. When the acceleration of the door body is less than or equal to the preset acceleration threshold, jump to step 1130; and when the acceleration of the door body is greater than the preset acceleration threshold, jump to step 1140, the fourth collected data of the fourth sensor may be obtained.

In some embodiments, the smart door lock may include a timer. The fourth collected data obtained by the fourth sensor before the timing duration of the timer reaches the preset time may be obtained when the acceleration of the door body is greater than the preset acceleration threshold. In some embodiments, the fourth sensor may include, but is not limited to, the geomagnetic sensor, the Hall sensor, the gyroscope sensor, or the like.

In step 1150, the current state of the door body may be determined based on the fourth collected data.

In some embodiments, the door body is in the closed state when the fourth collected data matches the first threshold may be determined; the door body is in the open state when the fourth collected data matches the second threshold may be determined. The first threshold and the second threshold may be the sensor values corresponding to the door in the closed and open states obtained by using the fourth sensor test before executing the method for controlling the smart lock of the embodiments of the present disclosure. In some embodiments, the door body is the closed state when the value of the fourth collected data is within a preset interval may be determined, otherwise, the door body is in the open state. In some embodiments, the preset interval may be an interval range obtained based on the first threshold and the second threshold. In some embodiments, the preset interval may be the interval range obtained by testing the corresponding sensor values when the door is in different positions.

In some embodiments, the detection value of the fourth sensor indicating that the door is closed or open may be tested to obtain the preset threshold or the interval. As an example, when the fourth sensor is the geomagnetic sensor, the detection value of the geomagnetic sensor indicating that the door is closed or open may be tested before executing the method for controlling the smart lock. For example, the magnetic field value of the door at different angles may be obtained based on the magnetic field change of the door detected by the geomagnetic sensor during the rotation of the door. After the door is completely closed, the current magnetic field value of the geomagnetic sensor may be obtained. Using the magnetic field value of the door in the closed state, the range of the magnetic field value may be the preset interval to explain the magnetic field value within the range, and the corresponding door may be in the closed state. Similarly, if the magnetic field value is not within the range, the corresponding door may not be in the closed state.

In some embodiments, the sensor may be corrected before obtaining the state of the smart door lock and/or the door body. As an example, when the fourth sensor is the gyroscope sensor, it may be possible to determine whether the coordinate shaft of the gyroscope sensor has been corrected according to whether there is correction data in the memory module (e.g., the memory module 230 shown in FIG. 2) before obtaining the state of the smart door lock and/or the door body, and correct it when it is not corrected. The coordinate shaft of the gyro sensor can be used to judge the door state. In some embodiments, the coordinate axis of the gyroscope sensor may be corrected according to the axis with the largest amount of rotation of the door in the open state and/or the closed state (also referred to as the target rotation axis in the embodiments of the present the present disclosure). For example, the indication of the gyroscope sensor on the target rotation axis may be taken as the indication of the angular velocity of the gyroscope sensor, while ignoring the angular velocity of other rotation axes of the gyroscope. For another example, one rotation axis of the gyroscope may be parallel to the target rotation axis by adjusting the position and angle of the gyroscope sensor.

In some embodiments, the data of the sensor may be corrected when it is in the abnormal state based on the state of the smart door lock and the door body. For example, when the fourth sensor is the gyroscope sensor, if the door is in the open state but the latch is in the ejected state (if the latch retracts when the door is open in the normal state), the door is in the abnormal state may be determined, and the gyroscope sensor may be controlled for the automatic correction. Specifically, when the angle of the door fed back by the gyroscope sensor is within the third preset angle range and remains for the preset time (also referred to as the third preset time in the present disclosure), the angle of the calibration door may be 0°. For example, when the angle of the door fed back by the gyroscope sensor is within [−2°, 2° ] and maintained for 20 seconds, the angle of the door may be calibrated to 0°.

In some embodiments, it may be possible to eliminate sensor errors, such as a static error and/or an accumulated error of the gyroscope sensors, before obtaining the state of the smart door lock and/or the door body. Among them, the static error may refer to the noise generated by the gyroscope sensor itself in the static environment, and the accumulated error may refer to the deviation accumulated by the gyroscope sensor over time.

In some embodiments, when the acceleration of the door body is greater than the preset acceleration threshold, the geomagnetic sensor may detect the current magnetic field value of the door and determine whether the obtained current magnetic field value is within the preset interval. If it is determined that the current magnetic field value is within the preset interval, the door is closed may be indicated, and if it is determined that the magnetic field value is not within the preset range, the door is not closed may be indicated.

In some embodiments, the state of the door may be determined based on the angle value of the door body and/or the smart door lock detected by the gyroscope sensor. For example, the door is closed may be determined based on the rotation angle of the target rotation axis detected by the gyroscope sensor is less than the preset angle and remains for at least the preset time (also referred to as the second preset time in the present disclosure).

In step 1160, whether the timing duration of the timer exceeds the preset duration may be determined. The fourth sensor may be controlled to be in the sleep state when the timing duration of the timer reaches the preset duration.

In this implementation mode, by setting the timer to control the state of the fourth sensor, it may avoid the high-power consumption caused by the fourth sensor in the working state for a long time. For example, when the user shakes the door body, the acceleration of the door body for a long time is greater than the preset threshold. If there is no timer, the fourth sensor may be always in the working state. After adding the timer, the time when the fourth sensor is in the working state may be limited to reduce the power consumption of the smart door lock. In some embodiments, the fourth sensor may be controlled to be in the sleep state when the acceleration is less than the preset acceleration threshold for the preset time.

The acceleration sensor may be a low-power sensor, which is always working and may not increase the power consumption of the smart door lock.

In some embodiments, the fourth collected data of the fourth sensor may be obtained first, and the detection value detected by the acceleration sensor may be further obtained after determining that the door body is in the closed state (or open state) based on the fourth collected data. The acceleration caused by the door being closed (or opened) may be detected by the acceleration sensor. Whether the door is closed (or open) may be further confirmed according to the detection value detected by the acceleration sensor. For example, when the gyroscope sensor determines that the door is closed and the indication of the acceleration sensor is greater than the preset acceleration, the door is closed may be confirmed.

In some embodiments, the state of the door may also be determined only by the collected data of the acceleration sensor or the fourth sensor. In some embodiments, the state of the door may also be determined based on the acceleration sensor, the geomagnetic sensor, and the gyroscope sensor. In some embodiments, when the door is in the closed state (or open state) based on the fourth sensor, the door is in the closed state (or open state) may be further determined based on the fact that the latch of the smart door lock is in the ejected state (retracted state) and maintained for at least the preset time (e.g., 5 seconds, 7 seconds, 9 seconds, 11 seconds, 13 seconds, or the like).

Figure 17:
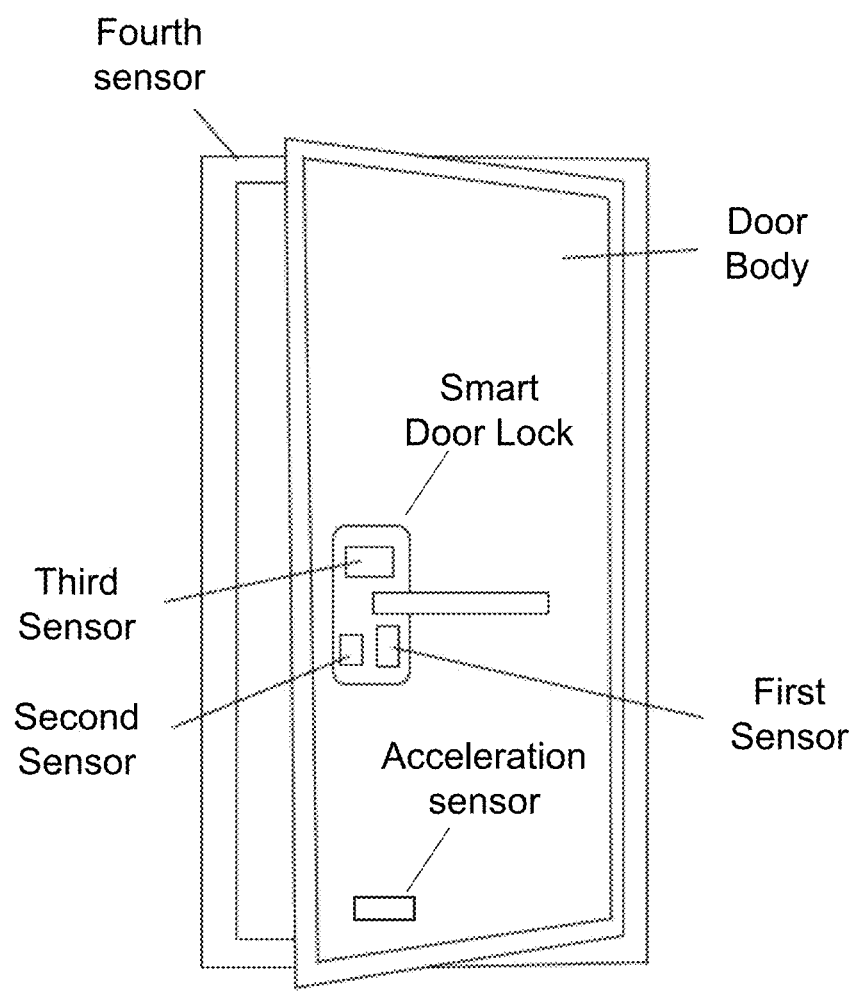
FIG. 17 is a structural diagram illustrating another exemplary smart door lock according to some embodiments of the present disclosure.

In some embodiments, as shown in FIG. 17, the first sensor, the second sensor and the third sensor may be arranged in the smart door lock, and the fourth sensor and the acceleration sensor may be arranged on the door body or frame on which the smart door lock is installed. In some embodiments, the fourth sensor and the acceleration sensor may be set in the same position or in different positions. In some embodiments, the fourth sensor and the acceleration sensor may be provided in the smart door lock.

It may be understood that the count and the position of the sensors in FIG. 17 are only examples. In some embodiments, the positions of the first sensor, the second sensor and the third sensor, as well as the fourth sensor and the acceleration sensor may be set at any reasonable position, and the smart door lock and/or the door body may include any one or more of the above sensors, the manual does not limit this.

In practical application, when the door is opened, it may shake continuously due to external influence, such as children or animals shaking the door, wind blowing, door shaking, or the like. In some embodiments, the continuous shaking state of the door may be determined by the acceleration sensor. Specifically, when the door is open, the plurality of acceleration values detected by the acceleration sensor within the preset time period (e.g., 5 seconds, 10 seconds, 20 seconds, 50 seconds, 1 minute, 3 minutes, 5 minutes, or the like) may be obtained to determine the change of the plurality of the acceleration values. For example, if the plurality of the acceleration values changes in a curve, t the door is in a shaking state may be determined; if the multiple acceleration values change in a horizontal straight line or close to the horizontal straight line, the door does not shake may be determined. In some embodiments, it may be possible to report or alert when the door is in the shaking state, for example, send it to the external device such as the server or the terminal device, or send an alarm tone, or the like. The continuous shaking of the door may lead to sensor detection error when the fourth sensor may be the gyroscope sensor. For example, the continuous shaking of the door may increase the accumulated error of the gyroscope sensor, resulting in the loss of angle when eliminating the accumulated error of the gyroscope sensor, or the like. The continuous shaking of the door is detected by the acceleration sensor and reported during the continuous shaking, which may correct the sensor data in time and reduce the detection error.

In some embodiments, the smart door lock may push the opening and closing state information of the smart door lock and/or the door body to the external devices. For example, the state information may be sent to the Internet of things gateway, which may send the opening and closing state information to the server, and the server may also send the opening and closing state information to the terminal devices of the user performing the corresponding remote target operation, so that the user may understand the progress of the remote control of the smart door lock.

The process 900-1100 of the method for controlling the smart lock applied to the smart door lock in these embodiments highlights that after the smart door lock performs the target operation, it may also obtain the opening and closing state information and report the opening and closing state information. Therefore, the scheme described in these embodiments may facilitate the user to understand the progress of the remote control of the smart door lock and improve the user experience. It should be noted that in these embodiments, the angle information (or the state information) of the smart door lock or the current position information (or the state information) of the door body may be obtained separately, or the angle information (or the state information) of the smart door lock and the current position information (or the state information) of the door body may be obtained at the same time.

In some embodiments, the opening and closing state information of the smart door lock and/or the door body may be obtained before controlling the smart door lock to perform the target operation, to determine whether it may execute the control instruction normally. For example, before controlling the smart door lock to perform the locking operation, the acceleration, an angular velocity, and/or a magnetic flux value of the door body installed with the smart door lock may be obtained to determine whether the door is closed. The smart door lock may be controlled to perform the locking operation when the door is closed, and the smart door lock may be reported to the user when the door is open.

FIG. 12 is the flowchart illustrating another exemplary process for controlling the smart lock according to some embodiments of the present disclosure. In order to facilitate understanding of the method for controlling the smart lock provided by the embodiments of the present disclosure, the control request may be configured to control the smart door lock/door body locking as an example in FIGS. 12-14.

As shown in FIG. 12, when the control request for the smart door lock is to control the smart door lock/door body locking, the method for controlling the smart lock may include the following steps.

In step 1210, the ciphertext information may be decrypted in response to the control request to obtain the locking instruction for the smart door lock.

For more information about decrypting the ciphertext information in response to the control request to obtain the locking instruction for the smart door lock, please refer to other parts of the present disclosure (for example, FIGS. 7-8 and the related description), which may not be repeated here.

In step 1220, whether the lock body installed with the smart door lock is in the closed state may be detected. In some embodiments, step 1220 may be performed by the execution unit 430 or the second obtaining unit 440.

In some embodiments, the executing body of the method for controlling the smart lock (such as the smart lock 130 shown in FIG. 1) may detect whether the door body installed with the smart lock is in the closed state through the plurality of the sensors arranged in the smart lock, such as the acceleration sensor, the geomagnetic sensor, the Hall sensor, the angle sensor, the gyroscope sensor, or the like, that is, the fourth sensor and/or the acceleration sensor. For more detection of the state of the door body state, please refer to other parts of the present disclosure (for example, FIGS. 9-11 and the related descriptions), which may not be repeated here.

In step 1230, the smart door lock may be controlled to perform the automatic locking operation when the door body is detected in the closed state.

In some embodiments, the above executing body may control the smart door lock to perform the automatic locking operation when the door body is detected in the closed state. Specifically, the latch of the smart door lock may be driven to pop up to realize automatic locking. For example, the smart door lock may control the rotation of the driving parts to drive the square shaft of the lock body to rotate through the plurality of gears to control the ejection of the lock tongue and realize automatic locking.

In some embodiments, the fourth sensor and/or the acceleration sensor may be controlled to be in the sleep state or low power consumption state after controlling the smart door lock to perform the automatic locking operation to reduce the power consumption of the smart door lock. Based on this, the fourth sensor and/or the acceleration sensor may be awakened before it is necessary to obtain the data collected by the fourth sensor and/or the acceleration sensor.

The method for controlling the smart lock disclosed in these embodiments may detect whether the door body installed with the smart lock is in the closed state, and control the smart lock to perform the automatic locking operation when the door body is detected in the closed state to ensure the safety of the user's living environment.

In some embodiments, the smart lock may be automatically locked after the user opens the door or closes the door. Specifically, the door lock may automatically lock after a period after the user closes the door. A locking record including the corresponding user (none), time, and mode (automatically) for closing the lock may be automatically record, and synchronize to the cloud when the door is connected to the network. A security tip may be prompt to the user when the lock is opened. The period may be set by the user, for example, the door may be closed immediately if the door magnet is installed, and the period may be set to 5s, 10s, or 30s if there is no door magnet installed, and the user may choose within a time range of 0-5 min. The automatic locking operation may be determined according to the time set by the user, and the safety notice may be prompt to the user to avoid closing the door by mistake. The user may configure a time period without automatic locking, when the time period overlaps with the time configuration mode, the time period scheme may be implemented first.

In some embodiments, the smart lock may be locked by a physical key after the user opens the door or closes the door. Specifically, the door lock may be locked directly by pressing the key on the panel. The locking record including the corresponding user (none), time, and mode (the physical key) for closing the lock may be automatically record, and synchronize to the cloud when the door is connected to the network.

In some embodiments, the user may close the door lock by clicking the door open button on an APP. Specifically, a distance for locking the door lock may include at least 2 meters in front of the door. The time of a Bluetooth transmission and a motor drive may be preset, such as 1s. An alert of the APP may include: the alert may be a sound of motor rotation if it is successful to lock the door, and the alert may be the sound of motor jamming if it is failed to lock the door. The locking record including the corresponding user, time, and mode (the APP) for closing the lock may be automatically record, and synchronize to the cloud when the door is connected to the network. The APP may be remotely controlled by the Bluetooth.

In some embodiments, the user may manually turn the handle in the door to lock the door. Specifically, the distance for locking the door lock may include at least 2 meters in front of the door. The locking record including the corresponding user (none), time, and mode (manually) for closing the lock may be automatically record, and synchronize to the cloud when the door is connected to the network.

In some embodiments, the lock/unlock state of the door lock may be viewed after connecting by the Bluetooth, In some embodiments, the current power information of the door lock may be checked by the user. For example, the user may directly check the power information of the door lock by the APP, and the user may directly check the low power state by the door lock/keypad, the information for replacing the battery may be prompted to the user when the device is in the low power state. The current power information may be prompted by an indicator light, a sound, and the APP.

In some embodiments, the user may check an unlocking record. For example, the user may view the unlocking record of the door lock when the user's mobile phone is connected to the door lock by the Bluetooth. The record type may be the mode for unlocking-time-user.

In some embodiments, the user may check a locking record. For example, the user may view the locking record of the door lock when the user's mobile phone is connected to the door lock by the Bluetooth. The record type may be the mode for locking-time-user.

In some embodiments, the used may check an abnormal event information on the current door lock. For example, the user may view the password error record and the alarm information of the door lock when the user's mobile phone is connected to the door lock by the Bluetooth. The record type may be the abnormal event-time.

In some embodiments, a long-time unlocked prompt may be sent to the user in order to avoid the user not closing the door after going home or leaving home. The duration of the long-time may be 5 mins.

In some embodiments, the user may be prompted when the lock body does not be retracted or ejected normally. For example, an alarm may be prompted to the user to repair the door when the door is sagging or misplaced, the misplaced may refer to: the range that the lock body can open is only the length of the door seam, the sagging may refer to: the lock body may be opened but the motor force demand becomes larger, or the lock tongue may extend a part but may not fully extend out.

In some embodiments, an effective time period for controlling the smart lock may be preset. Specifically, the user may set the effective time period for controlling the smart lock, for example, the effective time period may set to be 8:00 am-8:00 pm, that is, the method for controlling the smart lock may only take effect within this time period. The effective time period may be set on all methods without time setting, such as "automatic unlocking", "garbage mode", "holiday mode", or the like.

Figure 13:
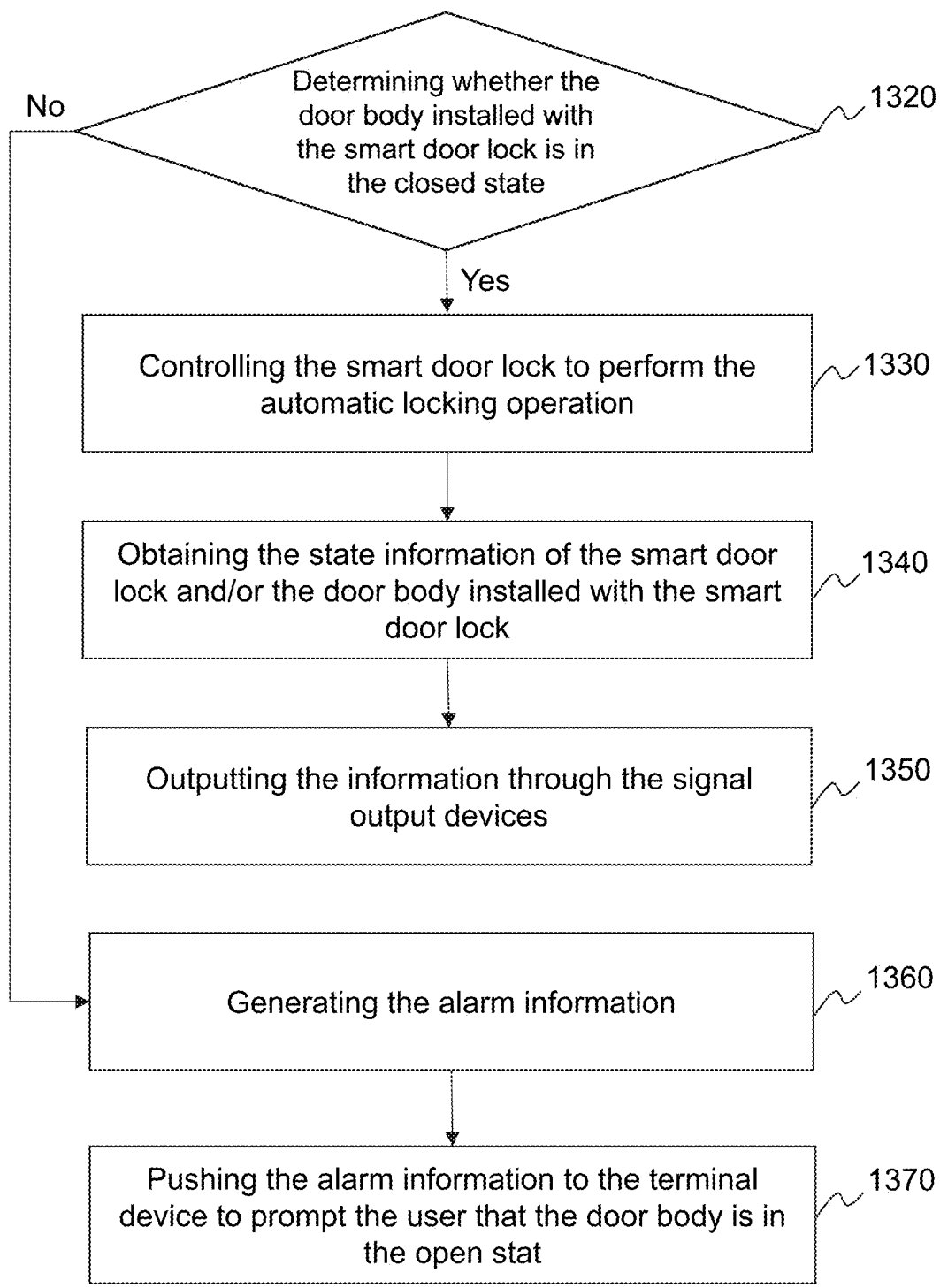
FIG. 13 is a flowchart illustrating another exemplary process for controlling the smart lock according to some embodiments of the present disclosure.

FIG. 13 is the flowchart illustrating another exemplary process for controlling the smart lock according to some embodiments of the present disclosure.

As shown in FIG. 13, the executing body of the method for controlling the smart lock (for example, the smart lock 130 shown in FIG. 1) may generate the locking information after controlling the automatic locking of the smart lock, and send the locking information to the server or output to the signal output device of the smart lock to inform the user that the lock is in the locked state, and when the door body (or other devices) is detected in the open state by the smart lock, the alarm message may be generated.

Among them, step 1320 and step 1330 are similar to step 1220 and step 1230 in process 1200, and step 1340 is similar to step 740 in process 700. For more contents, please refer to the corresponding parts and may not be repeated here.

In step 1350, the above executing body may generate the locking information based on the state information of the smart door lock and/or the door body installed with the smart door lock, and output the locking information through the signal output devices. In some embodiments, the smart door lock may include the signal output devices with a display screen or an audio player. After generating the locking information, the locking information may be output through the signal output devices.

In step 1360, the above executing body may control the smart door lock to generate the alarm information after determining that the door body is in the open state. In some embodiments, the alarm information may include, but is not limited to, the smart door lock identification, a corresponding unlocking method, an unlocking time, or the like.

In step 1370, the above executing body may push the alarm information to the terminal device to prompt the user that the door body is in the open state. For example, the above executive body may send the alarm information to the server after generating the alarm information, so that the server may push the alarm information to the user terminal and prompt the user that the door body is in the open state. In some embodiments, after controlling the smart door lock to generate the alarm information, the alarm information may also be output through the signal output devices. For example, the smart door lock may be equipped with an audio player, which may generate an alarm sound according to the alarm information and play the alarm sound through the audio player.

The process 1300 of the method for controlling the smart lock in these embodiments highlights that after the door lock may be automatically locked, the locking information may be generated and sent to the server or output to the signal output devices of the smart door lock to inform the user that the door lock is in the locked state, and when the smart door lock detects that the door body is in the open state, the smart door lock may be controlled to generate the alarm information, and the alarm information may be sent to the server or output to the signal output devices of the smart door lock to inform the user that the door body is in the open state and prompt the user to close the door. Therefore, the scheme described in these embodiments may facilitate the user to understand the state of the smart door lock to ensure the safety of the user's living environment and improve the user experience.

In some embodiments, the information to be pushed may be pushed to the corresponding terminal device of the user based on the type of the information to be pushed (e.g., the lock information, the alarm information, or the like) generated in the above embodiments. For example, the target topic to which the information to be pushed belongs may be determined, and the target user for receiving the message to be pushed may be determined based on the user role associated with the target topic. Among them, the target topic may be configured to reflect the meaning of the message to be pushed, for example, to represent the door lock state, for alarm, or the like, the target user may include users under the user role associated with the target topic. For example, the user role corresponding to the door lock state may be the owner of the smart door lock, and the user role corresponding to the user alarm information may be the property, the police, or the like.

In some embodiments, the corresponding smart door lock event may be generated and pushed based on the information about the smart door lock and/or the door body obtained by the plurality of smart devices such as the smart door lock and the imaging device associated with the smart door lock. One event may include one or more pieces of information about smart door locks and/or the doors. For example, the event may be generated based on the latch of the door lock is ejected based on the smart door lock, the door is in the open state, and the foreign matter obtained by the camera device is stuck between the door body and the door frame, and the event may include: the door does not close normally when the latch is ejected due to the foreign matter between the door body and the door frame.

Figure 14:
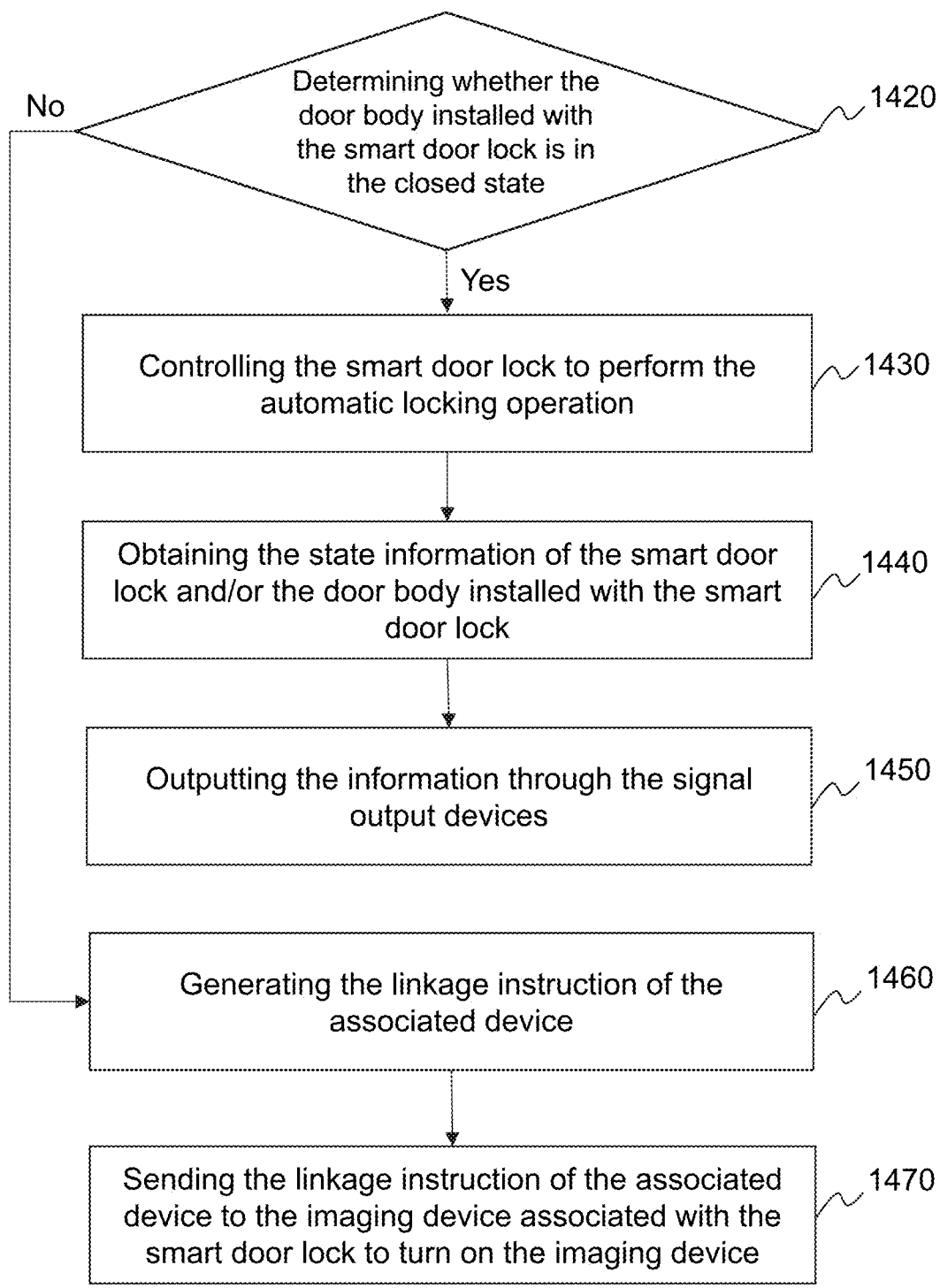
FIG. 14 is a flowchart illustrating another exemplary process for controlling the smart lock according to some embodiments of the present disclosure.

FIG. 14 is the flowchart illustrating another exemplary process for controlling the smart lock according to some embodiments of the present disclosure.

As shown in FIG. 14, the process 1400 of the method for controlling the smart lock in these embodiments may generate the associated device linkage instruction (i.e., step 1460) when the door body installed with the smart door lock is detected in the open state, and send the associated device linkage instruction to the imaging device associated with the smart door lock (i.e., step 1470). Among them, step 1420 and step 1430 are similar to step 1220 and step 1230 in process 1200, step 1320 and step 1330 in process 1300, step 1450 is similar to step 740 in process 700 and step 1340 in process 1300. For more details, please refer to the corresponding parts and may not be repeated here.

In this implementation mode, the smart door lock may be linked with a camera device to wake up the camera device to start working, and timely record the safety of the user's living environment, so as to timely and accurately record the occurrence process of the accident in case of the residential safety accident.

In some embodiments, when the user approaches the door body, the user may directly interact with the smart door lock based on the wireless signal of the terminal device carried by the user to complete the control of the smart door lock, thereby eliminating the server processing link and making the control operation more convenient. The method for controlling the smart lock provided by the embodiment of the present disclosure may also determine whether the preset conditions are met according to the wireless signal of the target terminal device by receiving the wireless signal of the target terminal device. When the preset conditions are met, the smart door lock may be controlled to perform the target operation according to the control instruction.

Figure 15:
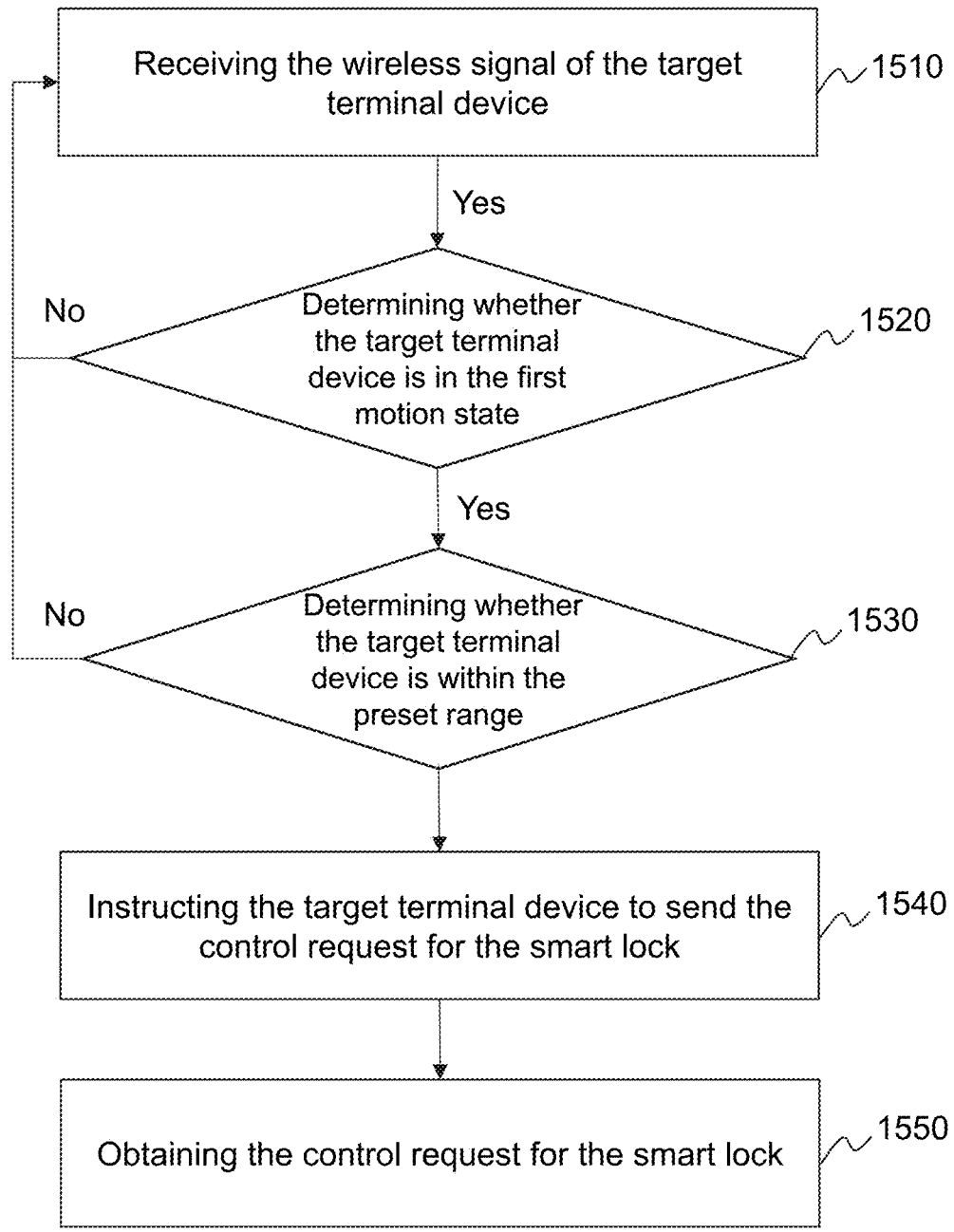
FIG. 15 is a flowchart illustrating another exemplary process for controlling the smart lock according to some embodiments of the present disclosure.

FIG. 15 is the flowchart illustrating another exemplary process for controlling the smart lock according to some embodiments of the present disclosure. In some embodiments, the process 1500 may be performed by the wireless interaction unit 460.

As shown in FIG. 15, the process 1500 may include the following steps.

In step 1510, the wireless signal of the target terminal device may be received. In some embodiments, the target terminal device may be a terminal device that establishes the wireless connection with the smart door lock.

In some embodiments, the wireless connection may be established between the executing body of the method for controlling the smart lock (such as the smart lock 130 shown in FIG. 1) and the target terminal device in a variety of ways, for example, a Bluetooth connection may be established between the smart door lock and the target terminal device. After the wireless connection is established between the smart lock and the target terminal device, the target terminal device may send the wireless signal to the smart lock, and the smart door lock may receive the wireless signal sent by the target terminal device.

In some embodiments, the above execution subject may determine whether the preset conditions are met according to the wireless signal of the target terminal device after receiving the wireless signal of the target terminal device. In some embodiments, the preset conditions may include preset unlocking conditions and/or preset locking conditions. In some embodiments, the preset unlocking conditions and the preset locking conditions may be set according to the actual unlocking or locking conditions. The preset unlocking conditions and the preset locking conditions may be the same conditions or different conditions, which are not limited in the present disclosure. For example, both the preset unlocking conditions and the preset locking conditions may be the target terminal device within the range set centered on the smart door lock. For another example, the preset unlocking condition may be that the target terminal device is moving close to the smart door lock, and the preset locking condition may be that the target terminal device is moving away from the smart door lock.

In some embodiments, the above execution subject may determine whether the motion state of the target terminal device meets the preset conditions according to the wireless signal of the target terminal device. Specifically:

In step 1520, whether the target terminal device is in the first motion state may be determined. If the target terminal device is in the first motion state, execute step 1530; and if the target terminal device is not in the first motion state, return to step 1510.

In some embodiments, whether the motion state of the target terminal device is the first motion state may be determined according to the wireless signal of the target terminal device, and the first determination result may be obtained, wherein the first movement state is close to the smart door lock.

In some embodiments, when determining whether the motion state of the target terminal device is the first motion state according to the wireless signal of the target terminal device, the first distance between the target terminal device and the smart door lock may be determined according to the first wireless signal of the target terminal device, the second distance between the target terminal device and the smart door lock may be determined according to the second wireless signal of the target terminal device, and the reception time of the second wireless signal may be later than the reception time of the first wireless signal. Whether the first distance is greater than the second distance may be determined, the motion state of the target terminal device may be the first motion state if the first distance is greater than the second distance, the motion state of the target terminal device may be the second motion state if the first distance is less than the second distance, and the second motion state may be away from the smart door lock.

In some embodiments, the first signal strength may be determined according to the first wireless signal of the target terminal device, and the second signal strength may be determined according to the second wireless signal of the target terminal device when determining whether the motion state of the target terminal device is the first motion state according to the wireless signal of the target terminal device. The reception time of the second wireless signal may be later than the reception time of the first wireless signal. Whether the first signal strength is less than the second signal strength may be determined, the motion state of the target terminal device may be the first motion state if the first signal strength is less than the second signal strength, and the motion state of the target terminal device may be the second motion state if the first signal strength is greater than the second signal strength. In some embodiments, whether the target terminal device is in the first motion state may be determined by other feasible ways, which may not be limited in the present disclosure.

In step 1530, whether the target terminal device is within the preset range when the target terminal device is in the first motion state may be determined. If the target terminal device is within the preset range, proceed to step 1540, if the target terminal device is not within the preset range, skip to step 1510.

In some embodiments, the above execution subject may determine whether the target terminal device is within the preset range according to the wireless signal of the target terminal device, and obtain the second determination result. The preset conditions may be met if the second determination result indicates that the target terminal device is within the preset range, and step 1540 is performed. If the first determination result is no, or the first determination result is yes, but the second determination result indicates that the target terminal device is outside the preset range, the preset conditions may not be met. In some embodiments, the preset range may be set differently according to the different scenes, for example, the preset range may be set in a circular area with the smart door lock as the center and the radius of N meters. N may be any value greater than 0, for example, 0.5 m, 1 m, 1.5 m, or the like.

In some embodiments, the third distance between the target terminal device and the smart door lock may be determined according to the third wireless signal of the target terminal device when the execution subject determines whether the target terminal device is within the preset range according to the wireless signal of the target terminal device, wherein the third wireless signal may be the wireless signal that determines that the target terminal device is received after approaching the smart door lock. Whether the third distance is less than or equal to the preset distance may be determined, the target terminal device may be within the preset range if the third distance is less than or equal to the preset distance, and the target terminal device may not be within the preset range if the third distance is greater than the preset distance.

It may be understood that the strength of the wireless signal may be negatively correlated with the distance between the target terminal device and the smart door lock, and then the distance between them may be determined based on the strength of the wireless signal.

In step 1540, instruct the target terminal device to send the control request for the smart lock.

In some embodiments, the target terminal device may be allowed to send the control request for the smart lock if the above execution subject determines that the preset conditions of the smart door lock are met according to the wireless signal of the target terminal device, and the smart door lock may send a message to the target terminal device, wherein the message may be configured to instruct the target terminal device to directly send the control request for the smart lock to the smart door lock based on the wireless signal.

In step 1550, the control request for the smart lock may be obtained.

In some embodiments, the target terminal device may send the control request for the smart lock after the target terminal device receives the message of the smart door lock, and the smart door lock may receive the control request for the smart lock. The smart door lock may obtain the control instruction by decrypting the ciphertext information after receiving the control request sent by the target terminal device, and control the smart door lock to perform the target operation according to the control instruction. For more information about controlling the smart door lock based on the control request, please refer to other parts of the present disclosure (for example, FIGS. 7-14 and the related descriptions), which may not be repeated here.

The method for controlling the smart lock provided by the embodiments may determine whether the preset conditions are met according to the wireless signal of the target terminal device by receiving the wireless signal of the target terminal device, the target terminal device may be instructed to send the control request for the smart lock if the preset conditions are met, the control request for the smart lock sent by the target terminal device may be received to realize that the whole process is automatically realized by the smart door lock and the terminal device without user participation, eliminate the server processing link, and improve the convenience of smart door lock control.

In some embodiments, the wireless signal transmitted by the target terminal device may include the Bluetooth signal. The Bluetooth connection may be established between the execution subject and the target terminal device. After the Bluetooth connection is established between the smart door lock and the target terminal device, the target terminal device may send the Bluetooth signal to the smart door lock, and the smart door lock may receive the Bluetooth signal sent by the target terminal device. The above executive body may determine whether the preset conditions are met based on the Bluetooth signal. For more details, please refer to steps 1510 to 1540 above, which may not be repeated here.

Figure 18:
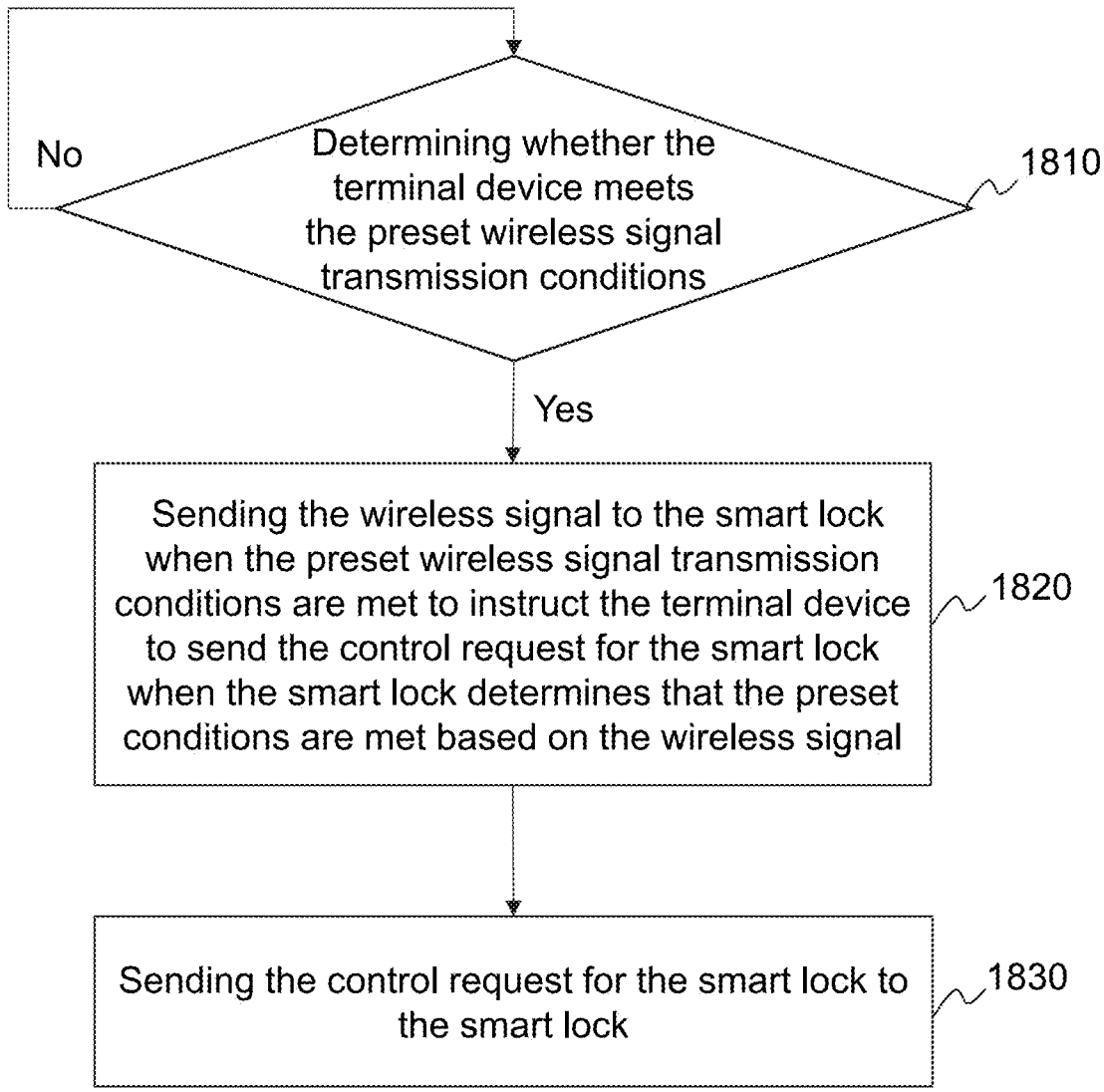
FIG. 18 is a flowchart illustrating another exemplary process for controlling the smart lock according to some embodiments of the present disclosure.

FIG. 18 is the flowchart illustrating another exemplary process for controlling the smart lock according to some embodiments of the present disclosure.

As shown in FIG. 18, a process 1800 of another embodiment of the method for controlling the smart lock may be shown. The method for controlling the smart lock may be applied to the terminal device (the terminal device 140 shown in FIG. 1). The process 1800 may include the following steps.

In step 1810, whether the terminal device meets the preset wireless signal transmission conditions may be determined. In some embodiments, step 1810 may be performed by the determination unit 610.

In some embodiments, the executing body of the method for controlling the smart lock (e.g., the terminal device 140 shown in FIG. 1) may always detect whether the executing body meets the preset wireless signal transmission conditions.

In some embodiments, the current geographic location determined by the mobile terminal device through its own positioning function may be obtained; whether the current geographic location is within a preset geographic location area may be determined, the preset geographic location area may an area within a preset geographic fence, for example, the area that may be pre-configured on the target terminal device, the terminal device may meet the preset wireless signal transmission conditions if the current geographic location is within the preset geographic location area, and the terminal device may not meet the preset wireless signal transmission conditions if the current geographic location is outside the preset geographic location area.

In some embodiments, the preset geofence may be a nearby area centered on the smart door lock. In some embodiments, the nearby area may be an area 2 meters, 5 meters, 8 meters, 10 meters, 20 meters, 30 meters, 50 meters, 100 meters, 150 meters, 200 meters, or the like, from a fixed position. For example, the preset geographic fence may be a geographic fence area with a radius of 3 meters, 10 meters, or 50 meters centered on the smart door lock. In some embodiments, the preset geofence may be the area around the user's house where the smart door lock is installed. For example, the preset geofence may be the geofence area within 20 meters, 80 meters, 100 meters, 150 meters, or 200 meters around the user's house. In some embodiments, the preset geofence may also be the geofence area set at a distance corresponding to the farthest wireless signal that the smart door lock may receive. In some embodiments, the preset geofence may also be the geofence area established based on the range that may be covered by the Wi-Fi network signal set in the user's living environment. In some embodiments, the preset geofence may be adjusted according to the actual needs of the user. In some embodiments, the preset geographic location area may be part or all the area within the preset geographic fence.

In some embodiments, the identification of the Wi Fi signal detected by the mobile terminal device may be obtained, whether the identification includes the identification of the target Wi-Fi signal may be determined, if the identification includes the identification of the target Wi-Fi signal, the terminal device may meet the preset wireless signal transmission conditions, and if the identification dose not include the identification of the target Wi-Fi signal, the terminal device may not meet the preset wireless signal transmission conditions. The target Wi-Fi signal may be the signal of the Wi-Fi network set in the living environment corresponding to the smart door lock. In some embodiments, the identification of the target Wi-Fi signal may be set in advance in the smart door lock, the server, the Internet of things gateway, the terminal device, or the like.

In step 1820, send the wireless signal to the smart lock when the preset wireless signal transmission conditions are met to instruct the terminal device to send the control request for the smart lock when the smart lock determines that the preset conditions are met based on the wireless signal. In some embodiments, step 1820 may be performed by the wireless transmission unit 620. In some embodiments, step 1810 may be performed again until the preset wireless signal transmission conditions are met when the preset wireless signal transmission conditions are not met.

In some embodiments, the above execution subject may continuously transmit the wireless signal to the smart lock after determining that the terminal device meets the preset wireless signal transmission conditions.

In step 1830, send the control request for the smart lock to the smart lock. In some embodiments, step 1830 may be performed by the second transmission unit 630.

In some embodiments, the above executing body may send the control request for the smart lock to the smart lock after receiving the information indicating that the smart lock sends the smart lock control request.

The method for controlling the smart lock provided by the embodiments may determine whether the terminal device meets the preset wireless signal transmission conditions, the wireless signal may be sent to the smart lock if the preset wireless signal transmission conditions are met so that when the smart lock determines that the preset conditions are met according to the wireless signal, send a message to the terminal device instructing the terminal device to send the control request for the smart lock, the terminal device may send the control request for the smart lock to the smart lock after receiving the message, which realizes that the terminal device sends the wireless signal to the smart lock only when the preset wireless signal transmission conditions are met, and avoid the situation that the terminal device always sends the wireless signal, resulting in large power consumption of the terminal device.

In some embodiments, the remote control instruction may be sent to the server when the terminal device meets the preset wireless signal transmission conditions, but cannot establish the wireless communication connection with the smart lock within the preset time range (e.g., 2 minutes, 5 minutes, 10 minutes, 15 minutes, or the like). For example, the terminal device may send the remote control instruction to the server if the terminal device fails to establish the wireless communication connection with the smart lock within 5 minutes after meeting the preset wireless signal transmission conditions, which generates the control request and sends it to the corresponding smart lock, so that the smart lock may automatically lock or unlock according to the control request. In some embodiments, the preset time range (also referred to as the first preset time range in the embodiments of the present disclosure) may include the time taken before the terminal device enters the preset geographical location area and reaches the door where the smart lock is installed. In some embodiments, the preset time range may be set according to the actual situation. For example, the preset time range may be the sum of the time spent after the terminal device enters the preset geographical location area and before the user walks to the door, which may not be limited in the present disclosure.

In some embodiments, when the terminal device does not obtain the signal instructing the terminal device to send the control request for the smart lock within the preset time range (also referred to as the second preset time range in the embodiment of the present disclosure), but meets the preset transmission conditions, the remote control instruction may be sent to the server. For example, when the terminal device does not receive the signal sent by the smart lock indicating that the terminal device sends the control request for the smart lock within 2 minutes, if the terminal device is close to the door according to the wireless signal of the terminal device or the current geographical location, the remote control instruction may be sent to the server to control the unlocking of the smart lock.

In embodiments, the terminal device may obtain the Bluetooth key issued by the server. The terminal device may encrypt the control request through the Bluetooth key.

The above description may be only a better embodiment of the present disclosure and a description of the applied technical principles, and may not be configured to limit the present disclosure. For those skilled in the art, the present disclosure may have various changes and changes. The scope of the invention involved in the present disclosure may not be limited to the technical scheme formed by the specific combination of the above technical features, but also covers other technical schemes formed by any combination of the above technical features or the equivalent features without departing from the above invention concept. For example, the technical scheme may be formed by replacing the above features with (but not limited to) the technical features with similar functions disclosed in the present disclosure.

Figure 19:
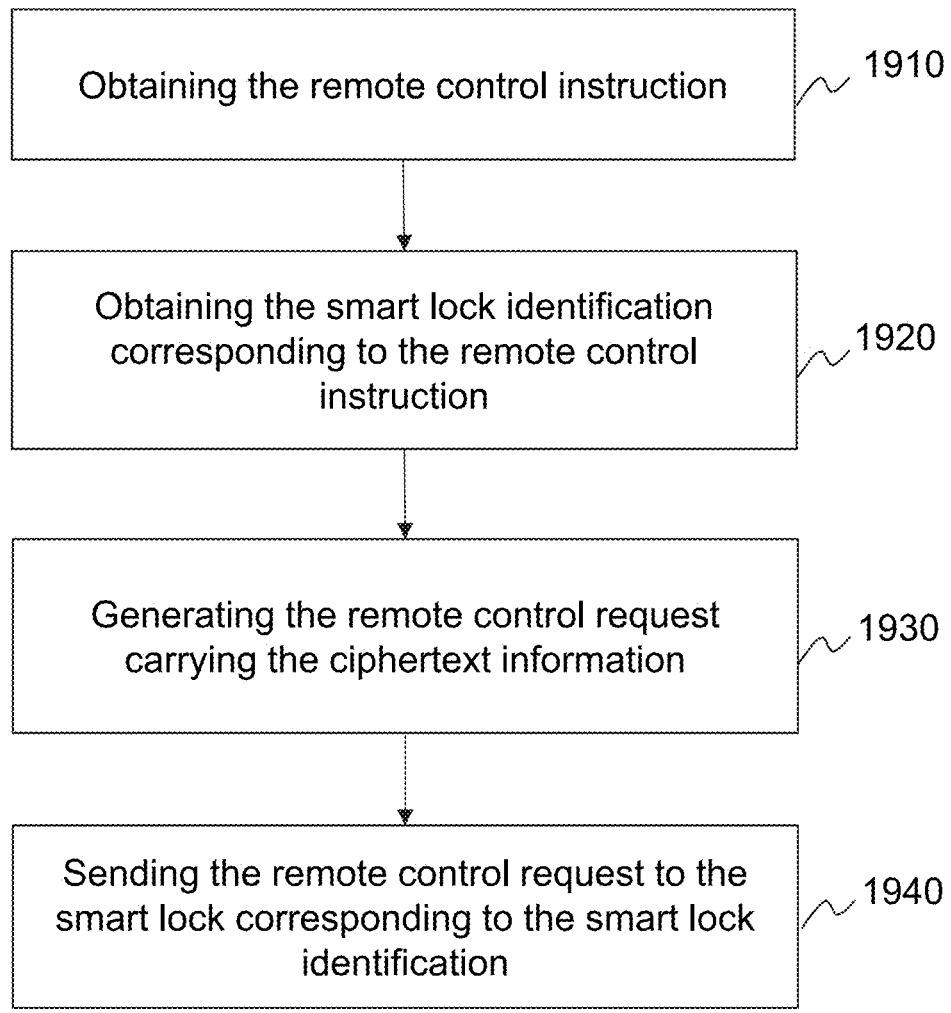
FIG. 19 is a flowchart illustrating another exemplary process for controlling the smart lock according to some embodiments of the present disclosure.

FIG. 19 is the flowchart illustrating another exemplary process for controlling the smart lock according to some embodiments of the present disclosure.

As shown in FIG. 19, a process 1900 of the embodiments of the method for controlling the smart lock applied to the server according to the present disclosure. The method for controlling the smart lock may be executed by the server (the server 110 shown in FIG. 1), including the following steps.

In step 1910, obtain the remote control instruction, wherein the remote control instruction is generated by the terminal device in response to the remote target operation input by the user. In some embodiments, step 1910 may be performed by the third obtaining unit 510.

In some embodiments, the remote control instruction obtained by the executing body of the method for controlling the smart lock (e.g., the server 110 shown in FIG. 1) may be generated by the terminal device (e.g., the terminal device 140 shown in FIG. 1) in response to the remote target operation input by the user on the specified application interface. The remote target operation may include the remote unlocking operation or the remote locking operation. The execution subject may be the server of the application corresponding to the specified application interface.

In some embodiments, the user may bind the specified application account with the target smart door lock. The user may log in to the specified application account in the terminal device and input the remote target operation in the specified application interface corresponding to the specified application account. The remote control instruction with the specified application account ID may be generated and sent to the server after the terminal device recognizes the remote target operation. Alternatively, the terminal device may generate the remote control instruction carrying the identification of the target smart lock and send the remote control instruction to the server after recognizing the remote target operation.

In some embodiments, the user may log in to the specified application account in the terminal device, and input the identification and the unlocking password of the target smart lock in the specified application interface corresponding to the specified application account. The terminal device may generate the remote control instruction with the identification and the unlocking password of the target smart lock, and send the remote control instruction to the server.

In step 1920, the smart lock identification corresponding to the remote control instruction may be obtained. In some embodiments, step 1920 may be performed by the third obtaining unit 510.

In some embodiments, when the remote control instruction carries the specified application account ID and the account corresponding to the specified application account ID has a bound smart lock, the smart lock ID with a binding relationship with the specified application account ID carried by the remote control instruction may be used as the smart lock identification corresponding to the remote control instruction.

In some embodiments, when the remote control instruction carries the identification of the target smart lock, the identification of the smart lock carried by the remote control instruction may be used as the smart lock identification corresponding to the remote control instruction.

In step 1930, the remote control request carrying the ciphertext information may be generated. In some embodiments, step 1930 may be performed by the request generation unit 520

In some embodiments, the above execution subject may bind with the smart lock in advance to determine the corresponding encryption key and decryption key. For example, the above executing agent may assign a pair of asymmetric keys composed of the public key and the private key to the smart lock. The execution subject may store the public key corresponding to the smart lock as the encryption key to generate the remote control request carrying the ciphertext information by using the asymmetric algorithm. As another example, the above executing body may issue the Bluetooth key to the smart lock and/or the terminal device in advance. The terminal device may encrypt the control instruction through the Bluetooth key, and the smart lock may decrypt the control request through the Bluetooth key.

In some embodiments, the execution subject may obtain the encryption key corresponding to the smart lock identification; the plaintext information corresponding to the smart lock identification may be obtained, wherein the plaintext information may include: the timestamp and the control instruction, wherein the timestamp may be configured to indicate the effective time of the control instruction. The plaintext information may be encrypted with the encryption algorithm according to the encryption key to obtain the ciphertext information, and the remote control request carrying the ciphertext information may be generated. In some embodiments, the plaintext information may also include the control password for verifying the execution authority of the control request. In some embodiments, the encryption algorithm may include, but is not limited to, one or more combinations of the symmetric encryption algorithm, the asymmetric encryption algorithm, or the like, which may not be limited in the present disclosure.

In step 1940, the remote control request may be sent to the smart lock corresponding to the smart lock identification. In some embodiments, step 1940 may be performed by the first transmission unit 530.

In some embodiments, the remote control request and the smart lock identification may be sent to the Internet of things gateway, and the Internet of things gateway may send the remote control request to the smart lock corresponding to the smart lock identification.

In the method for controlling the smart lock provided by the above embodiment of the present disclosure, the server may generate the remote control request carrying the ciphertext information in response to the remote control instruction, and send the remote control request to the smart lock corresponding to the smart lock identification. Through the above scheme, the user may realize the remote control of the smart lock. At the same time, by making the remote control request carry the ciphertext information, the risk of the hijacking and the leakage of the information carried by the remote control request may be reduced, which is conducive to improving the reliability and the security of the method for controlling the smart lock.

The basic concepts have been described above. Obviously, for those skilled in the art, the above detailed disclosure may only be an example and does not constitute a limitation of the present disclosure. Although not explicitly stated here, those skilled in the art may make various modifications, improvements, and amendments to the present disclosure. Such the modifications, the improvements and the amendments may not be proposed in the present disclosure, so such the modifications, the improvements and the amendments still belong to the spirit and scope of the exemplary embodiment of the present disclosure.

Meanwhile, the present disclosure uses specific words to describe the embodiments of the present disclosure. For example, "one embodiment", and/or "some embodiments" mean a feature, structure or feature related to at least one embodiment of the present disclosure. Therefore, it should be emphasized and noted that "one embodiment" or "some embodiments" or "an alternative embodiment" mentioned twice or more in different positions in the present disclosure does not necessarily refer to the same embodiment. In addition, some features, structures or features in one or more embodiments of the present disclosure may be combined appropriately.

In addition, those skilled in the art may understand that various aspects of the application may be described and described by several patentable types or situations, including any new and useful process, machine, product or combination of substances, or any new and useful improvement to them. Accordingly, various aspects of the present application may be completely executed by the hardware, by the software (including firmware, resident software, microcode, or the like), or by a combination of the hardware and the software. The above hardware or software may be referred to as "data block", "module", "engine", "unit", "component" or "system". In addition, aspects of the present application may be represented as a computer product located in one or more computer-readable media, which includes computer-readable program coding.

The computer storage medium may contain a transmitted data signal containing computer program coding, such as on baseband or as part of a carrier wave. The propagation signal may have a variety of forms, including electromagnetic form, optical form, or the like, or a suitable combination form. The computer storage medium may be any computer-readable medium other than a computer-readable storage medium, which may realize communication, propagation, or transmission of programs for use by connecting to an instruction execution system, or device. The program code located on the computer storage medium may be transmitted through any suitable medium, including radio, cable, optical fiber cable, RF, or similar medium, or any combination of the above media.

The computer program code required for the operation of each part of the application may be written in any one or more programming languages, including object-oriented programming languages such as Java, Scala, Smalltalk, Eiffel, jade, Emerald, C++, C#, VB.NET, Python, or the like, and conventional programming languages such as C language, Visual Basic, Fortran 2003, Perl, COBOL 2002, PHP, ABAP, Dynamic programming languages such as python, Ruby and Groovy, or other programming languages. The program code MAY be run completely on the user's computer, or as a separate software package on the user's computer, or partially on the user's computer, partially on the remote computer, or completely on the remote computer or server. In the latter case, the remote computer may be connected to the user computer through any network form, such as Local Area Network (LAN) or Wide Area Network (WAN), or connected to an external computer (such as through the Internet), or in a cloud computing environment, or used as a service, such as Software as a Service (SaaS).

In addition, unless explicitly stated in the claims, the order of processing elements and sequences, the use of numbers and letters, or the use of other names described in the application are not used to limit the order of processes and methods of the application. Although some embodiments of the invention currently considered useful have been discussed through various examples in the above disclosure, such details are only for the purpose of illustration, and the additional claims are not limited to the disclosed embodiments. On the contrary, the claims are intended to cover all amendments and equivalent combinations in conformity with the essence and scope of the embodiments of the present disclosure. For example, although the system components described above may be implemented by the hardware devices, the system components may also be implemented only by software solutions, such as installing the described system on an existing server or mobile device.

Similarly, it should be noted that in order to simplify the expression disclosed in the present disclosure and help the understanding of one or more embodiments of the invention, in the previous description of the embodiments of the present disclosure, a variety of features are sometimes combined into one embodiment, drawings or description thereof. However, this disclosure method does not mean that the object of the application needs more features than those mentioned in the claims. In fact, the features of the embodiments may be less than all the features of the single embodiment disclosed above.

Some numbers of the components and the attributes are used in some embodiments. Such numbers used for the description of embodiments are modified by the modifiers "about", "approximate" or "generally" in some examples. Unless otherwise stated, "approximately", or "substantially" indicate that a ±20% change in the number is allowed. Accordingly, in some embodiments, the numerical parameters used in the description and the claims are approximate values, which may be changed according to the required characteristics of individual embodiments. In some embodiments, the numerical parameters should consider the specified significant digits and adopt the method of general digit reservation. Although the numerical fields and the parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, or the like, the entire contents are hereby incorporated into the present disclosure for reference. Except for the present disclosure history documents that are inconsistent with or conflict with the content of the application, and the documents that limit the widest range of claims of the present disclosure (currently or later attached to the application). It should be noted that in case of any inconsistency or conflict between the description, the definition and/or the use of terms in the attached materials of the present disclosure and the contents described in the present disclosure, the description, the definition and/or the use of terms in the present disclosure shall prevail.

Finally, the embodiments described in the present disclosure are only used to illustrate the principles of the embodiments of the present disclosure. Other deformations may also fall within the scope of the present disclosure. Therefore, as an example rather than a limitation, the alternative configuration of the embodiment of the present disclosure may be regarded as consistent with the teaching of the present disclosure. Accordingly, the embodiments of the present disclosure may not be limited to the embodiments explicitly introduced and described in the present disclosure.

We claim:

1. A method for controlling a smart lock, implemented on a computing device having at least one processor and at least one storage medium, the method comprising:
    obtaining a control request for a smart lock, wherein the control request carries ciphertext information, wherein the ciphertext information is obtained by performing one or more encryption operations on at least part of the control request;
    decrypting the ciphertext information in response to the control request; and
    controlling the smart lock to perform a target operation based on a decrypted control request when the control request is to control the smart lock to lock, including:
        obtaining state information of a door body on which the smart lock is installed;
        determining a state of the door body based on the state information;
        when the door body is detected in a closed state:
            controlling the smart lock to perform an automatic locking operation;
            generating locking information, and sending the locking information to a terminal device to remind a user that the door body is in the closed state;
        when the door body is detected in an open state:
            generating alarm information, and sending the alarm information to the terminal device to remind the user that the door body is in the open state;
            generating a linkage instruction of an associated device, wherein the linkage instruction of the associated device is configured to control an imaging device associated with the smart lock to turn on, and sending the linkage instruction of the associated device to the imaging device.

2. The method of claim 1, wherein the decrypting the ciphertext information includes:
    decrypting the ciphertext information based on a decryption key corresponding to an encryption key of the ciphertext information to obtain the decrypted control request, wherein the smart lock includes an encryption chip for storing the decryption key.

3. The method of claim 1, wherein the decrypted control request includes at least a control instruction and a timestamp, wherein the timestamp is configured to indicate a validity time of the control instruction, and the controlling the smart lock to perform the target operation based on the decrypted control request includes:
    determining a current time, wherein the smart lock includes a clock chip, and the determining the current time includes:
        sending a current time acquisition request to the clock chip;
        obtaining a time returned by the clock chip as the current time, wherein the time returned by the clock chip is a time corrected by a network time protocol;
    determining whether the current time matches the timestamp; and
    if the current time matches the timestamp, controlling the smart lock to perform the target operation.

4. The method of claim 1, wherein the controlling the smart lock to perform the target operation based on the decrypted control request includes:
    controlling the smart lock to perform an automatic unlocking operation when the control request is to control the smart lock to unlock.

5. The method of claim 1, wherein the state information reflects a state of the smart lock and/or the door body before and/or after the target operation.

6. The method of claim 5, wherein the smart lock includes:
    a first sensor configured to detect angle information of a square shaft of a smart lock body, and the obtaining the state information of the smart lock includes:
        obtaining first collected data of the first sensor; and
        determining the state information of the smart lock based on the first collected data;
    a second sensor configured to detect a dynamic/static state of the square shaft of the smart lock body, and the obtaining the state information of the smart lock further includes:
        obtaining a second collected data of the second sensor;
        determining the dynamic/static state of the square shaft of the smart lock body based on the second collected data; and
        waking up the first sensor when the dynamic/static state of the smart lock body indicates that the square shaft changes from a static state to a rotating state.

7. The method of claim 5, wherein the smart lock includes a third sensor, the third sensor is configured to detect a retraction angle of a driving part of the smart lock, wherein the driving part is configured to drive a movement of the square shaft of the smart lock body, and the obtaining the state information of the smart lock further includes:
    obtaining third collected data of the third sensor;
    determining the retraction angle of the driving part based on the third collected data;
    controlling the driving part to stop rotating when the retraction angle of the driving part meets a preset angle threshold; and
    controlling the driving part to keep retracting to reach the preset angle threshold when the retraction angle of the driving part does not meet the preset angle threshold.

8. The method of claim 1, wherein the door body includes a fourth sensor, the fourth sensor is configured to detect position information of the door body, wherein the fourth sensor includes a geomagnetic sensor or a gyro sensor, and obtaining state information of the door body includes:
    obtaining a fourth collected data of the fourth sensor; and
    determining the state of the door body based on the fourth collected data.

9. The method of claim 8, wherein the determining the state of the door body based on the fourth collected data includes:
    determining that the door body is in the closed state when the fourth collected data matches a first threshold or the door body is in the open state when the fourth collected data matches a second threshold; or determining that the door body is in the closed state when a value of the fourth collected data is within a preset interval or the door body is in the open state.

10. The method of claim 8, wherein the door body further includes an acceleration sensor, and the determining the state of the door body further includes:
   determining an acceleration of the door body based on a collected data of the acceleration sensor, and obtaining the fourth collected data of the fourth sensor when the acceleration is greater than a preset acceleration threshold;
   obtaining and recording the fourth collected data of the fourth sensor at the same time when the acceleration is greater than the preset acceleration threshold; and controlling the fourth sensor to be in a sleep state when a recording time exceeds a preset time; or
   controlling the fourth sensor to be in the sleep state when the acceleration is less than the preset acceleration threshold within the preset time.

11. The method of claim 1, wherein before the obtaining the control request for the smart lock includes:
   receiving a wireless signal of a target terminal device, wherein the wireless signal includes a Bluetooth signal and the target terminal device is a terminal device that establishes a wireless connection with the smart lock;
   determining whether a preset condition is met based on the wireless signal of the target terminal device; and
   instructing the target terminal device to send the control request for the smart lock when the preset condition is met.

12. The method of claim 11, wherein the determining whether a preset condition is met based on the wireless signal of the target terminal device includes:
   determining whether a motion state of the target terminal device is a first motion state based on the wireless signal of the target terminal device, wherein the first motion state is close to the smart lock;
   determining whether the target terminal device is within a preset range based on the wireless signal of the target terminal device when the motion state is the first motion state; and
   determining the preset condition is met when the target terminal device is within the preset range.

13. The method of claim 12, wherein the determining whether the motion state of the target terminal device is the first motion state based on the wireless signal of the target terminal device includes:
   determining a first distance between the target terminal device and the smart lock based on a first wireless signal of the target terminal device;
   determining a second distance between the target terminal device and the smart lock based on a second wireless signal of the target terminal device, wherein a reception time of the second wireless signal is later than the reception time of the first wireless signal;
   determining the motion state of the target terminal device is the first motion state when the first distance is less than the second distance; and
   determining the motion state of the target terminal device is the second motion state when the first distance is larger than the second distance, wherein the second motion state is away from the smart lock.

14. The method of claim 12, wherein the determining whether the target terminal device is within the preset range based on the wireless signal of the target terminal device includes:
   obtaining a third wireless signal of the target terminal device;
   determining a third distance between the target terminal device and the smart lock based on the third wireless signal of the target terminal device;
   determining whether the third distance is less than or equal to a preset distance; and
   determining the target terminal device is within the preset range when the third distance is less than or equal to a preset distance.

15. The method of claim 1, implemented on a server, including:
   obtaining a remote control instruction, wherein the remote control instruction is generated by a terminal device in response to a remote target operation input by a user;
   obtaining a smart lock identifier corresponding to the remote control instruction;
   generating a control request for a smart lock carrying ciphertext information; and
   sending the control request to the smart lock corresponding to the smart lock identifier.

16. The method of claim 1, implemented on a terminal device, including:
   determining whether the terminal device meets a preset wireless signal transmission condition;
   sending a wireless signal to the smart lock if the preset wireless signal transmission condition is met so that when the smart lock determines that the preset condition is met based on the wireless signal, instructing the terminal device to send the control request for the smart lock; and
   sending the control request for the smart lock to the smart lock so that the smart lock controls the smart lock to perform a target operation based on the control request for the smart lock.

17. The method of claim 16, wherein the determining whether the terminal device meets the preset wireless signal transmission condition includes:
   obtaining a current geographical location of the terminal device, determining whether the current geographic location is within a preset geographic location area, and determining the terminal device meets the preset wireless signal transmission condition if the current geographic location is within the preset geographic location area; or
   obtaining an identification of a Wi-Fi signal detected by the terminal device, determining whether the identification includes the identification of a target Wi-Fi signal and determining the terminal device meets the preset wireless signal transmission condition if the identification includes the identification of the target Wi-Fi signal.

18. The method of claim 16, wherein the method further includes:
   sending a remote control instruction to the server when the terminal device meets the preset wireless signal transmission condition and fails to successfully establish a wireless communication connection with the smart lock within a preset time range.

19. The method of claim 16 wherein the sending the wireless signal to the smart lock includes:
   sending a Bluetooth signal to the smart lock.

20. A non-transitory computer-readable storage medium, comprising instructions that, when executed by at least one processor, direct the at least processor to perform a method for controlling a smart lock, the method comprising:

obtaining a control request for a smart lock, wherein the control request carries ciphertext information;

decrypting the ciphertext information in response to the control request; and controlling the smart lock to perform a target operation based on a decrypted control request when the control request is to control the smart lock to lock, including:

obtaining state information of a door body on which the smart lock is installed;

determining a state of the door body based on the state information;

when the door body is detected in a closed state:
controlling the smart lock to perform an automatic locking operation;
generating locking information, and sending the locking information to a terminal device to remind a user that the door body is in the closed state;

when the door body is detected in an open state:
generating alarm information, and sending the alarm information to the terminal device to remind the user that the door body is in the open state;
generating a linkage instruction of an associated device, wherein the linkage instruction of the associated device is configured to control an imaging device associated with the smart lock to turn on, and sending the linkage instruction of the associated device to the imaging device.

\* \* \* \* \*